(12) United States Patent
Sonobe et al.

(10) Patent No.: US 11,394,019 B2
(45) Date of Patent: Jul. 19, 2022

(54) METHOD FOR PRODUCING CARBONACEOUS MATERIAL FOR NEGATIVE ELECTRODE OF NON-AQUEOUS ELECTROLYTE SECONDARY BATTERY AND PRODUCTION APPARATUS THEREOF

(71) Applicants: Kureha Corporation, Tokyo (JP); Tsukishima Kikai Co., Ltd., Tokyo (JP)

(72) Inventors: Naohiro Sonobe, Tokyo (JP); Mayu Komatsu, Tokyo (JP); Koji Miwa, Tokyo (JP); Kokei Ueno, Tokyo (JP)

(73) Assignees: KUREHA CORPORATION, Tokyo (JP); TSUKISHIMA KIKAI CO., LTD., Tokyo (JP)

( * ) Notice: Subject to any disclaimer, the term of this patent is extended or adjusted under 35 U.S.C. 154(b) by 0 days.

(21) Appl. No.: 16/972,424

(22) PCT Filed: Jun. 6, 2019

(86) PCT No.: PCT/JP2019/022602
§ 371 (c)(1),
(2) Date: Dec. 4, 2020

(87) PCT Pub. No.: WO2019/235586
PCT Pub. Date: Dec. 12, 2019

(65) Prior Publication Data
US 2021/0234147 A1    Jul. 29, 2021

(30) Foreign Application Priority Data
Jun. 6, 2018 (JP) .............................. JP2018-109005

(51) Int. Cl.
*H01M 4/04* (2006.01)
*H01M 4/66* (2006.01)
(Continued)

(52) U.S. Cl.
CPC ......... *H01M 4/0471* (2013.01); *H01M 4/663* (2013.01); *H01M 10/0525* (2013.01);
(Continued)

(58) Field of Classification Search
CPC ............... H01M 4/0471; H01M 4/663; H01M 10/0525; H01M 2004/027; H01M 4/045;
(Continued)

(56) References Cited

U.S. PATENT DOCUMENTS 6,686,048 B1   2/2004 Arimoto et al.
2009/0142253 A1   6/2009 Nagata et al.
(Continued)

FOREIGN PATENT DOCUMENTS

CN    101428823 A    5/2009
CN    106663810 A    5/2017
(Continued)

OTHER PUBLICATIONS

Japanese Office Action for Japanese Patent Application No. 2020-523184, dated Dec. 1, 2020.
(Continued)

*Primary Examiner* — Milton I Cano
*Assistant Examiner* — Suphia Quraishi
(74) *Attorney, Agent, or Firm* — Birch, Stewart, Kolasch & Birch, LLP (57) ABSTRACT

There are provided a method capable of producing a large amount of a carbonaceous material for a negative electrode of a non-aqueous electrolyte secondary battery from a carbon precursor impregnated with an alkali metal element or an alkali metal compound, and an apparatus for performing such production. The method for producing a carbonaceous material for a negative electrode of a non-aqueous electrolyte secondary battery includes a heat treatment step of feeding a carbon precursor containing an elemental alkali (Continued)

metal and/or an alkali metal compound, heating the carbon precursor in a temperature range from 1000° C. to 1500° C. in a non-oxidizing gas atmosphere to produce a carbonaceous material, and discharging the carbonaceous material; and an exhaust gas treatment step of contacting a non-oxidizing exhaust gas containing a gas and a flying carbonaceous matter evolved in the heat treatment step with water or an aqueous solution to treat the exhaust gas.

14 Claims, 2 Drawing Sheets

(51) Int. Cl.
  *H01M 10/0525* (2010.01)
  *H01M 4/02* (2006.01)
  *H01M 4/40* (2006.01)

(52) U.S. Cl.
  CPC .............. *H01M 4/04* (2013.01); *H01M 4/045* (2013.01); *H01M 4/0416* (2013.01); *H01M 4/0428* (2013.01); *H01M 4/0478* (2013.01); *H01M 4/40* (2013.01); *H01M 2004/027* (2013.01)

(58) Field of Classification Search
  CPC .... H01M 4/0428; H01M 4/40; H01M 4/0416; H01M 4/0478; H01M 4/0421; H01M 4/04
  USPC ............................................... 429/231, 231.8
  See application file for complete search history.

(56) References Cited

U.S. PATENT DOCUMENTS

| | | | |
|---|---|---|---|
| 2017/0170478 A1* | 6/2017 | Mihara | .................. H01G 11/50 |
| 2017/0229708 A1 | 8/2017 | Sonobe et al. | |
| 2017/0237070 A1 | 8/2017 | Sonobe et al. | |
| 2017/0326527 A1 | 11/2017 | Kume et al. | |
| 2018/0316004 A1 | 11/2018 | Tokoro et al. | |

FOREIGN PATENT DOCUMENTS

| | | | |
|---|---|---|---|
| EP | 3179542 | A1 | 6/2017 |
| JP | S57-208079 | A | 12/1982 |
| JP | 2000-24447 | A | 1/2000 |
| JP | 2000-327441 | A | 11/2000 |
| JP | 2004041825 | A | 2/2004 |
| JP | 2004509274 | A | 3/2004 |
| JP | 2017-073325 | A | 4/2017 |
| JP | 2017-183080 | A | 10/2017 |
| JP | 2017-224419 | A | 12/2017 |
| JP | 6553307 | B2 | 7/2019 |
| WO | 2016/021736 | A1 | 2/2016 |
| WO | 2016/021737 | A1 | 5/2017 |
| WO | 2017/213002 | A1 | 12/2017 |

OTHER PUBLICATIONS

Office Action issued in the CN Patent Application No. CN201980031637.8; dated Mar. 22, 2021.
European Office Action for European Application No. 19815443.7, dated Dec. 14, 2021.
Chinese Office Action for Chinese Application No. 201980031637.8, dated Sep. 23, 2021, with English translation.

* cited by examiner

METHOD FOR PRODUCING CARBONACEOUS MATERIAL FOR NEGATIVE ELECTRODE OF NON-AQUEOUS ELECTROLYTE SECONDARY BATTERY AND PRODUCTION APPARATUS THEREOF

TECHNICAL FIELD

The present invention relates to a method for producing a carbonaceous material for a negative electrode of a non-aqueous electrolyte secondary battery and a production apparatus thereof.

BACKGROUND ART

Small portable devices such as mobile telephones or notebook personal computers are being made highly functional, and thus secondary batteries used as power supplies thereof are expected to have a high energy density. A non-aqueous solvent-type lithium secondary battery using a carbonaceous material as a negative electrode has been proposed as a secondary battery having a high energy density (Patent Document 1).

In recent years, large secondary batteries having high energy density and excellent output characteristics are increasingly mounted in electric vehicles in response to increasing concern on environmental issues. For example, increasing use of such secondary batteries is anticipated in vehicle applications such as in electric vehicles (EV), which are driven solely by motors, and plug-in hybrid electric vehicles (PHEV) and hybrid electric vehicles (HEV) in which internal combustion engines and motors are combined. In particular, lithium-ion secondary batteries, which are non-aqueous electrolyte lithium secondary batteries, are widely used as secondary batteries having a high energy density, and are further expected to have a higher energy density to extend a cruising distance per charge in EV applications. To achieve a high energy density, it is necessary to increase a doping and de-doping capacity of lithium in a negative electrode material.

In light of the circumstances, a method has been proposed in which a carbon precursor is impregnated with a compound containing an alkali metal element and then subjected to main heat treatment, or after pre-heat treatment, further subjected to main heat treatment to produce a carbonaceous material used for a negative electrode of a non-aqueous electrolyte secondary battery (Patent Document 2). Furthermore, a method for producing a carbonaceous material used for a negative electrode of a non-aqueous electrolyte secondary battery has been proposed in which a carbon precursor is impregnated with a compound containing an alkali metal element and then subjected to main heat treatment, or after pre-heat treatment, further subjected to main heat treatment and then the resulting heat treated carbon is coated with pyrolytic carbon (Patent Document 3). When the carbonaceous material thus obtained is used as a negative electrode material of a non-aqueous electrolyte secondary battery, a high discharge capacity is exerted.

By the way, the main heat treatment in Patent Document 2 and Patent Document 3 is a heat treatment of a carbon precursor impregnated with an alkali metal compound at 800 to 1500° C. in a non-oxidizing gas atmosphere. At this time, the compound containing the alkali metal element with which the carbon precursor is impregnated is reduced into alkali metal and evaporates. The alkali metal that has evaporated in this manner, for example, precipitates in a low temperature part in a furnace (e.g., the boiling point of metallic sodium, which is an alkali metal, is 883° C. and is liquid at a temperature below this temperature), or reacts with a hydrogen gas evolved in carbonization reaction of the carbon precursor to form a hydrogenated alkali metal compound and precipitates in the low temperature part (e.g., sodium hydride decomposes at about 800° C. or higher and is solid at a temperature below this temperature).

Patent Document 2 and Patent Document 3 describe an example in which using a horizontal tubular furnace, a small amount of the carbon precursor is heated batch-wisely under flowing a non-oxidizing gas thereinto in the main heat treatment. In such batch-wise heat treatment, the volatilized alkali metal is discharged to an exhaust gas side by the non-oxidizing gas flowing into the furnace, so that the volatilized alkali metal does not re-adhere to the heated carbon. Furthermore, the heated carbon amount is small, and thus the alkali metal or alkali metal hydride produced by reaction of the alkali metal, even though adhering to the low temperature part of the furnace, is easily treated.

On the other hand, when mass production is performed by scaling up such a heat treatment process step, a large amount of alkali metal is produced. Alkali metals and alkali metal hydrides are easy to be ignited and need to be safely treated. In addition, in the batch treatment described in Patent Document 2 and Patent Document 3, a large amount of energy is required for temperature rising, and it takes time to raise and lower temperature. Thus, there is a demand to develop a technology for mass-producing a carbonaceous material used as a negative electrode material for a non-aqueous electrolyte secondary battery.

CITATION LIST

Patent Document

Patent Document 1: JP S57-208079 A
Patent Document 2: WO 2016/021736
Patent Document 3: WO 2016/021737
Patent Document 4: JP 2000-327441 A

SUMMARY OF INVENTION

Technical Problem

The present invention was conceived in light of the circumstances described above, and an object of the present invention is to provide a method that can produce a large amount of a carbonaceous material for a negative electrode of a non-aqueous electrolyte secondary battery from a carbon precursor impregnated with an alkali metal element or an alkali metal compound, and an apparatus for such production.

Solution to Problem

The present inventors have found that when a carbon precursor containing an alkali metal element or an alkali metal compound is fed and heated in a temperature range from 1000° C. to 1500° C. in a non-oxidizing gas atmosphere to produce a carbonaceous material, and the carbonaceous material is discharged to perform continuous heat treatment of a carbon precursor, a non-oxidizing exhaust gas containing a gas and a flying carbonaceous matter evolved in the heat treatment is evolved, and that such an exhaust gas can be treated by contact with water or an aqueous solution, and thereby completed the present invention. Specifically, the present invention provides the following aspects.

(1) A first aspect of the present invention is a method for producing a carbonaceous material for a negative electrode of a non-aqueous electrolyte secondary battery, the method including: a heat treatment step of feeding a carbon precursor containing an alkali metal element and/or an alkali metal compound, heating the carbon precursor in a temperature range from 1000° C. to 1500° C. in a non-oxidizing gas atmosphere to produce a carbonaceous material, and discharging the carbonaceous material; an exhaust gas treatment step of bringing a non-oxidizing exhaust gas containing a gas and a flying carbonaceous matter evolved in the heat treatment step into contact with water or an aqueous solution to treat the exhaust gas.

(2) A second aspect of the present invention is the method for producing a carbonaceous material for a negative electrode of a non-aqueous electrolyte secondary battery according to the first aspect, wherein the heat treatment step includes feeding and heating the carbon precursor continuously and discharging the produced carbonaceous material continuously.

(3) A third aspect of the present invention is the method for producing a carbonaceous material for a negative electrode of a non-aqueous electrolyte secondary battery according to the first or second aspect, wherein the heat treatment step includes introducing a non-oxidizing gas from a discharge side of the carbonaceous material and suctioning the exhaust gas by an exhaust means.

(4) A fourth aspect of the present invention is the method for producing a carbonaceous material for a negative electrode of a non-aqueous electrolyte secondary battery according to the third aspect, wherein the heat treatment step includes providing a suction port of the exhaust means on the discharge side of the carbonaceous material to suction the exhaust gas.

(5) A fifth aspect of the present invention is the method for producing a carbonaceous material for a negative electrode of a non-aqueous electrolyte secondary battery according to the third aspect, wherein the heat treatment step includes providing the suction port of the exhaust means on a feeding side of the carbon precursor to suction the exhaust gas.

(6) A sixth aspect of the present invention is the method for producing a carbonaceous material for a negative electrode of a non-aqueous electrolyte secondary battery according to any one of the first to fifth aspects, wherein the exhaust gas treatment step further includes a recovery step of filtering an aqueous solution in which the exhaust gas has been absorbed and recovering the flying carbonaceous matter in the aqueous solution.

(7) A seventh aspect of the present invention is the method for producing a carbonaceous material for a negative electrode of a non-aqueous electrolyte secondary battery according to any one of the first to sixth aspects, wherein, in the heat treatment step, the carbon precursor is fed so that areal weight is 15 kg/m$^2$ or less.

(8) An eighth aspect of the present invention is a production apparatus for a carbonaceous material for a negative electrode of a non-aqueous electrolyte secondary battery, the apparatus including: a heat treatment unit configured to feed a carbon precursor containing an alkali metal element and/or an alkali metal compound continuously, heat the carbon precursor in a temperature range from 1000° C. to 1500° C. in a non-oxidizing gas atmosphere to produce a carbonaceous material, and discharge the carbonaceous material continuously; and an exhaust gas treatment unit configured to bring a non-oxidizing exhaust gas containing a gas and a flying carbonaceous matter produced in the heat treatment step into contact with water or an aqueous solution to treat the exhaust gas.

Advantageous Effects of Invention

According to the present invention, it is possible to provide a method for mass-producing a carbonaceous material for a negative electrode of a non-aqueous electrolyte secondary battery from a carbon precursor impregnated with an alkali metal element or an alkali metal compound, and an apparatus for performing such production.

DESCRIPTION OF EMBODIMENTS

Although embodiments of the present invention will be specifically described hereinafter, the present invention is not limited to the following embodiments and can be implemented with appropriate modifications. Note that, in the present specification, the designation "X to Y" (X and Y each are an arbitrary numerical value) means "X or more and Y or less".

Method for Producing a Carbonaceous Material for a Negative Electrode of a Non-Aqueous Electrolyte Secondary Battery A method for producing a carbonaceous material for a negative electrode of a non-aqueous electrolyte secondary battery according to the present invention is a method including: a heat treatment step of feeding and heating a carbon precursor containing an alkali metal element or an alkali metal compound in a temperature range from 1000° C. to 1500° C. in a non-oxidizing gas atmosphere to produce a carbonaceous material, and discharging the carbonaceous material; and an exhaust gas treatment step of bringing a non-oxidizing exhaust gas containing a gas and a flying carbonaceous matter produced in the heat treatment step into contact with water or an aqueous solution to treat the exhaust gas.

Heat Treatment Step

The heat treatment step is a step of feeding and heating a carbon precursor containing an alkali metal element or an alkali metal compound in a temperature range from 1000° C. to 1500° C. in a non-oxidizing gas atmosphere to produce a carbonaceous material, and discharging the carbonaceous material. Note that heat treatment in such a temperature range from 1000° C. to 1500° C. in a non-oxidizing gas atmosphere is also referred to as "main heat treatment".

Carbon Precursor Containing Alkali Metal Element or Alkali Metal Compound

In the present invention, "a carbon precursor containing an alkali metal element or an alkali metal compound" refers to a carbon precursor, which will be described later, impregnated with an alkali metal element or an alkali metal compound, or a carbon precursor obtained by being impregnated with an alkali metal element or an alkali metal compound and heated at 400° C. or higher and lower than 800° C. in a non-oxidizing gas atmosphere (hereinafter, also referred to as "pre-heat treatment").

Carbon Precursor

The carbon precursor serving as a carbon source of the carbonaceous material is not particularly limited as long as it is a carbon material which has a composition having a carbon element content of 80 wt. % or greater when heat-treated at 1100° C. or higher in a non-oxidizing atmosphere.

When a carbonization yield of the carbon precursor at 1100° C. is too low, the proportion of the alkali metal element or the alkali metal compound relative to the carbon precursor becomes excessive in the heat treatment step, which is not preferable because it causes an increase in specific surface area and the like. Because of this, the carbonization yield when the carbon precursor is heat-treated at 1100° C. in a non-oxidizing atmosphere is preferably 30 wt. % or greater, more preferably 40 wt. % or greater, and even more preferably 50 wt. % or greater.

The carbon precursor is not particularly limited, but one having an atomic ratio (H/C) of hydrogen atoms to carbon atoms is preferably 0.05 or higher, more preferably 0.15 or higher, and even more preferably 0.30 or higher. A carbon precursor having an H/C of less than 0.05 is thought to be heated prior to alkali impregnating. Even when such a carbon precursor is subjected to alkali impregnating, an alkali metal element or the like cannot be sufficiently impregnated in the carbon precursor. Therefore, even when heating is performed after alkali impregnating, it may be difficult to form sufficient pores that enable doping and de-doping of a large amount of lithium.

The carbon source of the carbon precursor is not particularly limited, and examples thereof include: petroleum pitch or tar; coal pitch or tar; thermoplastic resin (for example, ketone resin, polyvinyl alcohol, polyethylene terephthalate, polyacetal, polyacrylonitrile, styrene/divinylbenzene copolymer, polyimide, polycarbonate, modified polyphenylene ether, polybutylene terephthalate, polyarylate, polysulfone, polyphenylene sulfide, polyimide resin, fluororesin, polyamideimide, aramid resin, or polyetheretherketone); and thermosetting resins (for example, epoxy resin, urethane resin, urea resin, diallylphthalate resin, polyester resin, polycarbonate resin, silicon resin, polyacetal resin, nylon resin, furan resin, phenol resin, melamine resin, amino resin, and amide resin).

The carbonaceous material of the present invention is preferably graphitizable carbonaceous or a non-graphitizable carbonaceous. Therefore, when a petroleum pitch or tar, a coal pitch or tar, or a thermoplastic resin is used as a carbon source, crosslinking (infusibilization) treatment such as oxidation may be performed, but a relatively low oxygen content (degree of oxygen crosslinking) is preferable. In addition, the carbonaceous material of the present invention may also be obtained without infusibilization. That is, the purpose of performing crosslinking treatment on the tar or pitch is to continuously control the structure of the tar or pitch subjected to crosslinking treatment from a graphitizable carbon precursor to a non-graphitizable carbon precursor. Examples of the tar or pitch include petroleum tar or pitch obtained as a by-product of the ethylene production, coal tar produced by the coal carbonization, heavy oil components or pitch obtained by distilling out low-boiling-point components of coal tar, or tar and pitch obtained by coal liquefaction. Two or more of these types of tar and pitch may also be mixed together and used.

Infusibilization Treatment

Examples of methods of crosslinking treatment of a petroleum pitch or tar, a coal pitch or tar, a thermoplastic resin, or the like include a method of using a crosslinking agent or a method of treatment with an oxidizer such as air.

When a crosslinking agent is used, a carbon precursor is obtained by adding a crosslinking agent to the petroleum pitch or tar or the coal pitch or tar and mixing the substances while heating so as to promote crosslinking reactions. For example, a polyfunctional vinyl monomer, with which crosslinking reactions are promoted by radical reactions, such as divinylbenzene, trivinylbenzene, diallyl phthalate, ethylene glycol dimethacrylate, or N,N-methylene bis-acrylamide may be used as a crosslinking agent. Crosslinking reactions caused by the polyfunctional vinyl monomer are initiated by adding a radical initiator. Here, α,α'-azobisisobutyronitrile (AIBN), benzoyl peroxide (BPO), lauroyl peroxide, cumene hydroperoxide, dicumyl peroxide, 1-butyl hydroperoxide, hydrogen peroxide, or the like may be used as a radical initiator.

In addition, when crosslinking reactions are progressed by treatment with an oxidizer such as air, it is preferable to obtain the carbon precursor with the following method. Specifically, after a 2- or 3-ring aromatic compound with a boiling point of 200° C. or higher or a mixture thereof is added to a petroleum or coal pitch or the like as an additive and mixed while heating, the mixture is formed to obtain a pitch shaped body. Next, after the additive is extracted and removed from the pitch shaped body with a solvent having low solubility with respect to the pitch and having high solubility with respect to the additive so as to form a porous pitch, the porous pitch is oxidized using an oxidizer to obtain a carbon precursor. The purpose of the aromatic additive described above is to make the shaped body porous by extracting and removing the additive from the pitch shaped body after molding, to facilitate crosslinking treatment by means of oxidation, and to make the carbonaceous material obtained after carbonization porous. Such an additive described may be selected, for example, from one of naphthalene, methyl naphthalene, phenyl naphthalene, benzyl naphthalene, methyl anthracene, phenanthrene, or biphenyl or a mixture of two or more thereof. The added amount relative to the pitch is preferably in the range from 30 to 70 parts by weight relative to 100 parts by weight of pitch. To achieve a homogeneous mixture of the pitch and the additive, they are mixed in the molten state while heating. The mixture of the pitch and the additive is preferably molded into particles with a particle size of 1 mm or less so that the additive can be easily extracted from the mixture. Molding may be performed in the molten state or may be performed by cooling and then pulverizing the mixture. Suitable examples of solvents for extracting and removing the additive from the mixture of the pitch and the additive include aliphatic hydrocarbons such as butane, pentane, hexane, or heptane, mixtures of aliphatic hydrocarbon primary constituents such as naphtha or kerosene, and aliphatic alcohols such as methanol, ethanol, propanol, or butanol. By extracting the additive from the shaped body of the mixture of pitch and additive using such a solvent, the additive can be removed from the shaped body while the shape of the shaped body is maintained. It is surmised that holes are formed by the removed additive in the shaped body at this time, and a pitch shaped body having uniform porosity can be obtained.

In order to crosslink the obtained porous pitch, the porous pitch is then preferably oxidized using an oxidizer at a temperature from 120 to 400° C. Here, an oxidizing gas such as $O_2$, $O_3$, $NO_2$, a mixed gas in which these are diluted with air, nitrogen, or the like, or air, or an oxidizing liquid such as sulfuric acid, nitric acid, or hydrogen peroxide water can be used as an oxidizer. It is convenient and economically advantageous to perform crosslinking treatment by oxidizing the material at 120 to 400° C. using a gas containing oxygen such as air or a mixed gas of air and another gas such as a combustible gas, for example, as an oxidizer. In this case, when the softening point of the pitch or the like is low, the pitch melts at the oxidation, which makes oxidation difficult, and thus the pitch or the like that is used preferably has a softening point of 150° C. or higher.

Infusibilization treatment may be also performed in the same manner when a petroleum pitch or tar, coal pitch or tar, or thermoplastic resin other than a porous pitch obtained by the method described above is used as a carbon precursor. That is, the method used for infusibilization treatment is not particularly limited, but infusibilization treatment may be performed using an oxidizer, for example. The oxidizer is also not particularly limited, and an oxidizing gas such as $O_2$, $O_3$, $SO_3$, $NO_2$, a mixed gas in which these are diluted with air, nitrogen, or the like, or air may be used. In addition, an oxidizing liquid such as sulfuric acid, nitric acid, or hydrogen peroxide or a mixture thereof can be used. The oxidation temperature is also not particularly limited but is preferably from 120 to 400° C. When the temperature is lower than 120° C., a crosslinked structure cannot be formed sufficiently, and particles fuse to one another in the heat treatment step. When the temperature exceeds 400° C., decomposition reactions become more prominent than crosslinking reactions, and the yield of the resulting carbon material becomes low.

The carbon precursor does not need to be pulverized, but it may be pulverized in order to reduce the particle size. Pulverization may be performed before infusibilization, after infusibilization (before alkali impregnating), and after alkali impregnating. Furthermore, pulverization may be performed multiple times at the time described above. That is, the particle size may be adjusted to a particle size appropriate for infusibilization, a particle size appropriate for alkali impregnating, or a particle size appropriate for heat treatment. A pulverizer used for pulverization is not particularly limited, and a jet mill, a rod mill, a vibratory ball mill, a hammer mill, or a tornado mill, for example, can be used.

As described above, the order of pulverization is not limited. However, in order to achieve a high charge/discharge capacity, which is an effect of the present invention, it is preferable to uniformly impregnate the carbon precursor with an alkali and then perform heat treatment. Therefore, it is preferable to perform pulverization before alkali impregnating. In order to achieve the particle size of the carbonaceous material that is ultimately obtained, it is preferable to pulverize the carbon precursor to have an average particle size from 1 to 50 μm in the pulverization step.

The average particle size of the carbon precursor is not limited, but if the average particle size is too large, impregnating with an alkali metal element or alkali metal compound may be inhomogeneous, and a large charge/discharge capacity may not be achieved. Therefore, the upper limit of the average particle size of the carbon precursor is preferably 600 μm or less, more preferably 100 μm or less, even more preferably 50 μm or less, and particularly preferably 30 μm or less. On the other hand, when the average particle size is too small, the specific surface area may increase, and an irreversible capacity may increase as a result. In addition, the flying or the like of particles may increase. Therefore, the lower limit of the average particle size of the carbon precursor is preferably 1 μm or greater, more preferably 3 μm or greater, and even more preferably 5 μm or greater.

Oxygen Content (Degree of Oxygen Crosslinking)

An oxygen content when the carbon precursor is infusibilized by oxidation is not particularly limited as long as the effect of the present invention can be achieved. Note that in the present specification, the oxygen contained in the carbon precursor may be oxygen contained as a result of oxidation (infusibilization) or may be oxygen contained originally. However, in the present specification, when the carbon precursor is infusibilized by oxidation, the oxygen atoms incorporated into the carbon precursor as a result of the oxidation reaction often play a role of crosslinking molecules of the carbon precursor with one another, and thus the "degree of oxygen crosslinking" may be used with the same meaning as the "oxygen content".

Here, when infusibilization treatment by oxygen crosslinking is not performed, the oxygen content (degree of oxygen crosslinking) may be 0 wt. %, but the lower limit of the oxygen content (degree of oxygen crosslinking) is preferably 1 wt. % or greater, more preferably 2 wt. % or greater, and even more preferably 3 wt. % or greater. When the oxygen content is less than 1 wt. %, selective orientation of hexagonal network planes in the carbon precursor may become high to deteriorate repetition characteristics. The upper limit of the oxygen content (degree of oxygen crosslinking) is preferably 20 wt. % or less, more preferably 18 wt. % or less, and even more preferably 15 wt. % or less. When the oxygen content exceeds 20 wt. %, pores for storing lithium may not be sufficiently achieved.

Alkali Metal Element or Alkali Metal Compound

The alkali metal element or alkali compound is a material with which the carbon precursor described above is impregnated.

The carbon precursor may be impregnated with the alkali metal element in the metal state, but may also be impregnated with the alkali metal element as a compound containing an alkali metal element such as a hydroxide, a carbonate, a hydrogencarbonate, or a halogen compound. The alkali metal compound is not particularly limited, but a hydroxide or carbonate is preferable because the permeability is high and the carbon precursor can be impregnated uniformly, and a hydroxide is particularly preferable.

Lithium, sodium, or potassium may be used as the alkali metal element or the elemental alkali metal contained in the alkali metal compound with which the carbon precursor is impregnated. Sodium is preferably used as the alkali metal element because the effect of expanding a space is particularly high and reactivity with graphitic materials that may be used as the furnace reactor tube is low. Note that lithium is widely used as an active material for a non-aqueous electrolyte secondary battery, and thus can be preferably used in terms of residual elements in the carbonaceous material, but lithium may have a low activity for alkali activation. By using sodium, stable main heat treatment can be performed.

Impregnation

By adding an alkali metal element or an alkali metal compound to the carbon precursor described above, an alkali-impregnated carbon precursor can be obtained. The method of adding an alkali metal element or an alkali metal compound is not particularly limited. For example, into the carbon precursor, a predetermined amount of an alkali metal element or an alkali metal compound may be mixed in a powder state. In addition, an alkali metal compound may be dissolved in an appropriate solvent to prepare an alkali metal compound solution. After this alkali metal compound solution is mixed with the carbon precursor, the solvent may be volatilized to prepare a carbon precursor impregnated with an alkali metal compound. Specifically, although not particularly limited, an alkali metal hydroxide such as sodium hydroxide may be dissolved in water, which is a good solvent, to form an aqueous solution, and this may be added to the carbon precursor. After heating to 50° C. or higher, moisture may be removed at atmospheric pressure or reduced pressure to add the alkali metal compound to the carbon precursor. The carbon precursor is often hydrophobic, and when the compatibility of the alkali aqueous solution is low, the compatibility of the alkali aqueous solution to the carbon precursor can be improved by adding an alcohol as appropriate. When an alkali metal hydroxide is used and the impregnation treatment is performed in air, the alkali metal hydroxide absorbs carbon dioxide so that the alkali metal hydroxide transforms into a carbonate of an alkali metal compound, and the penetration force of the alkali metal compound into the carbon precursor decreases, and thus it is preferable to reduce the carbon dioxide concentration in the atmosphere. Moisture merely needs to be removed to a degree that enables the fluidity of the alkali-impregnated carbon precursor to be maintained.

The impregnated amount of the alkali metal element or alkali metal compound with which the carbon precursor is impregnated is not particularly limited, but the upper limit of the impregnated amount is preferably 30 wt. % or less, more preferably 20 wt. % or less, and even more preferably 15 wt. % or less, and particularly preferably 10 wt. % or less. In a case where the impregnated amount of the alkali metal element or the alkali metal compound is too large, excessive alkali activation occurs. Therefore, the specific surface area increases, and this causes the irreversible capacity to increase, which is not preferable. In addition, the lower limit of the added amount is not particularly limited but is preferably 2 wt. % or greater, more preferably 3 wt. % or greater, and even more preferably 5 wt. % or greater. When the added amount of the elemental alkali metal or alkali metal compound is too small, it becomes difficult to form a pore structure for doping and de-doping, which is not preferable.

When an alkali metal compound is dissolved or dispersed in an aqueous solution or an appropriate solvent, and the carbon precursor is impregnated with it and then dried by volatizing the solvent such as water, the alkali-impregnated carbon precursor may agglomerate to become clumpy. If the clumpy alkali-impregnated carbon precursor is heated (pre-heat treatment and main heat treatment which will be described below), it is not possible to sufficiently discharge a decomposed gas or the like evolved in the heating, which has an adverse effect on performance. Therefore, if the alkali-impregnated carbon precursor becomes clumpy, it is preferable to disintegrate the alkali-impregnated carbon precursor and then perform pre-heat treatment and main heat treatment.

Pre-Heat Treatment

Pre-heat treatment can remove volatile components such as $CO_2$, $CO$, $CH_4$, $H_2O$, and $H_2$, as well as a tar content. When the alkali-impregnated carbon precursor is directly heat-treated at high temperatures, a large amount of decomposition products are evolved. These decomposition products may cause secondary decomposition reactions at high temperatures to adhere to the surface of the carbon material to cause a decrease in battery performance or adhere to the inside of the furnace to cause blockage of the furnace. Therefore, it is preferable to perform pre-heat treatment prior to performing main heat treatment to reduce decomposition products in main heat treatment. When the pre-heat treatment temperature is too low, the removal of decomposition products may be insufficient. On the other hand, if the pre-heat treatment temperature is too high, the decomposition products may cause reactions such as secondary decomposition reactions. The pre-heat treatment temperature is preferably 400° C. or higher and lower than 800° C. and is more preferably 500° C. or higher and lower than 800° C. If the pre-heat treatment temperature is lower than 400° C., the removal of tar becomes insufficient to increase the amount of tar or gas evolved in the main heat treatment step after pulverization, and the tar or gas may adhere to particle surfaces, which may cause failure to maintain the surface property after pulverization, leading to a decrease in battery performance. On the other hand, if the pre-heat treatment temperature is 800° C. or higher, the temperature exceeds the tar-generating temperature range, which may decrease the used energy efficiency. Furthermore, the evolved tar causes a secondary decomposition reaction, and the tar adheres to the alkali-impregnated carbon precursor, which may cause a decrease in performance.

The pre-heat treatment can use either a batch type furnace or a continuous type furnace. The pre-heat treatment is performed in a non-oxidizing gas atmosphere. Examples of the non-oxidizing gas include an inert gas such as helium and argon, and nitrogen and these may be used alone or as a mixture. In addition, pre-heat treatment can be also performed under reduced pressure.

Main Heat Treatment

The main heat treatment of the present invention is a step in which a carbon precursor containing an alkali metal element or an alkali metal compound is heated in a temperature range from 1000° C. to 1500° C. in a non-oxidizing gas atmosphere. With such main heat treatment, a carbonaceous material for a negative electrode of a non-aqueous electrolyte secondary battery can be obtained. Note that, in the following description, for convenience, a "carbon precursor containing an alkali metal element or an alkali metal compound" is abbreviated as an "alkali-impregnated carbon precursor".

Main Heat Treatment Furnace

A furnace used for main heat treatment is not particularly limited as long as the furnace is a furnace capable of controlling the heating atmosphere and capable of performing heat treatment at 1000° C. or higher, but it is preferable to use a furnace that can continuously perform heat treatment from the perspective of a more efficient mass production. Examples of furnaces that can perform continuous heat treatment at 1000° C. or higher include a tunnel kiln, a pusher kiln, a roller hearth kiln, and a rotary kiln. The tunnel kiln is a continuous furnace that includes a preheating zone, a heating zone, and a cooling zone, and is a continuous type furnace in which products are placed on a heating carriage and delivered. The pusher kiln is a continuous type furnace in which products placed on a base plate are delivered by pushing it with a hydraulic pusher. The roller hearth kiln is a continuous type furnace in which a roller conveyor is placed to transport products. The roller hearth kiln is capable of faster transport compared to the pusher kiln, and it is able to reduce the height of a layer of heated powder. The rotary kiln has a structure in which an alkali-impregnated carbon precursor stored in a hopper is fed to a continuous tubular furnace reactor tube using a feeder, and thus has a higher sealability compared to other kilns and can control the atmosphere inside the furnace with high precision. When the alkali-impregnated carbon precursor is fed to the tubular furnace reactor tube that is inclined and rotated, the alkali-impregnated carbon precursor is continuously heated while moving within the furnace reactor tube, and thus an evolved gas basically occurs within the furnace reactor tube. Furthermore, since the furnace body and the inside of the furnace reactor tube are separated from each other by the furnace reactor tube, it is possible to avoid contamination associated with the evolved gas and condensation of an alkali metal or alkali metal compound throughout the furnace by removing the evolved gas in the furnace reactor tube. In addition, the transport speed of the carbonaceous material produced by heat treatment in the rotary kiln can be freely controlled by a rotational speed of the furnace reactor tube, an inclination angle, a size of the furnace reactor tube, and the like, and rapid temperature rise and heat treatment for a short time are also possible. From this perspective, it is preferable to use a rotary kiln. However, in a furnace capable of continuous heat treatment, the carbon precursor is continuously fed and heated, whereby an exhaust gas is continuously discharged to generate a large amount of the exhaust gas in the furnace. Thus, removal of the exhaust gas in such a furnace is particularly important.

A material of the furnace reactor tube used in the rotary kiln is not particularly limited as long as the material has heat resistance against 1000° C. or higher and alkaline resistance. Examples of materials having superior heat resistance and alkaline resistance include graphite and ceramics. A material having a structure of $SiO_2$ as mullite ($SiO_2$/$Al_2O_3$) is not preferable because $SiO_2$ and an alkali hydroxide may react to form an alkali silicate compound. Examples of available ceramics include alumina ($Al_2O_3$), zirconia ($ZrO_2$), magnesia (MgO), silicon carbide (SiC), tungsten carbide (WC), silicon nitride ($Si_3N_4$), and titanium nitride (TiN). Of these, graphite is preferably used because graphite has excellent heat resistance, excellent thermal shock resistance, and excellent chemical resistance.

The lower limit of the main heat treatment temperature in an embodiment of the present invention is 1000° C. or higher, more preferably 1100° C. or higher, even more preferably 1150° C. or higher, and particularly preferably 1200° C. or higher. When the main heat treatment temperature is too low, a pore structure suitable for storing lithium cannot be formed, and it is difficult to volatilize and remove the alkali metal element. Also, a lot of functional groups remain in the carbonaceous material to increase the value of H/C, which may increase an irreversible capacity of lithium expressed as a difference between a doping capacity and a de-doping capacity in the carbonaceous material due to a reaction with lithium. On the other hand, the upper limit of the main heat treatment temperature in an embodiment of the present invention is 1500° C. or lower, more preferably 1400° C. or lower, and even more preferably 1300° C. or lower. If the main heat treatment temperature exceeds 1500° C., the pores formed as lithium storage sites may be reduced, and the discharge capacity may be lowered.

Main heat treatment is preferably performed in a non-oxidizing gas atmosphere. Examples of the non-oxidizing gas include an inert gas such as helium and argon, and nitrogen and the like that cause no oxidation reaction at 1000° C. to 1500° C. and these may be used alone or as a mixture. Furthermore, although main heat treatment can be performed at an increased pressure, an ordinary pressure, and a reduced pressure, from the perspective of volatizing an alkali metal, main heat treatment can be performed at a reduced pressure, for example, at a pressure of 95 kPa or lower under a non-oxidizing gas flowing.

The alkali-impregnated carbon precursor is subjected to main heat treatment at 1000° C. to 1500° C. in a non-oxidizing gas atmosphere to produce an exhaust gas in which a large amount of gaseous alkali metal or a compound thereof is contained. The carbonaceous material after heat treatment is conveyed from the heated part to the low-temperature part to be cooled, but upon this cooling, in a case where the exhaust gas is present near the carbonaceous material, the alkali metal element or the alkali metal compound precipitates to re-adheres to the heated carbonaceous material. The alkali metal that has re-adhered in this way re-penetrates a skeletal structure of the heated carbonaceous material, and then it becomes difficult to remove the alkali metal even by washing, which may adversely affect the battery performance. In addition, when the exhaust gas diffuses and retains in a wide range in the furnace, the alkali metal element and the alkali metal compound condense and accumulate in the low-temperature part of parts constituting the furnace, which is not preferable from the perspective of apparatus maintenance.

When a furnace such as a roller hearth kiln and a pusher kiln, in which a heat resistant container or plate made of graphite, ceramic, or the like moves on a roller or the like in an elevated temperature tunnel is used as the furnace, the temperature of the lower part of the roller or the like in addition to the inlet or the outlet is easily decreased, and thus, for example, a non-oxidizing gas is injected from the inlet, the outlet, and downward of the furnace to form a flow of gas from the low temperature part (the furnace, such as the inlet, the outlet, and the lower part of the furnace) to the high temperature part. This can prevent the exhaust gas from diffusing and convecting in a wide range in the furnace. Note that the "inlet" and "outlet" herein refer to the vicinity of the inlet and the vicinity of the outlet of the furnace body after gas replacement is performed. Therefore, they do not refer to a gas replacement chamber provided at the inlet and outlet of the apparatus.

In the furnace having a structure in which a carbon to be heated in main heat treatment is placed on a heat resistant container or plate and moved in the furnace to perform main heat treatment, the position of the exhaust port of the high-temperature part for discharging an exhaust gas is not particularly limited, but from the perspective of preventing condensation of the exhaust gas, a position having a higher temperature is preferable.

The temperature of a portion where the exhaust port is provided is preferably 800° C. or higher, more preferably 1000° C. or higher, and even more preferably 1100° C. or higher. A plurality of exhaust ports may be provided, and when the positions of the exhaust ports are provided in the vicinity of the carbon to be heated, the exhaust gas can be effectively prevented from diffusing in a wide range in the furnace. For providing the exhaust port in the vicinity of the carbon to be heated, a method of lowering the upper part of the furnace to an extent that the movement of the carbon to be heated and the container that contains the carbon is prevented, a method of providing a heat resistant exhaust pipe at the upper part of the furnace, and the like are exemplified.

In the case where a rotary kiln (rotary tubular furnace) is used as the main heat treatment furnace, its heating form is greatly different from that of the roller hearth kiln. Hereinafter, main heat treatment using this rotary kiln will be described with reference to FIG. 1. Note that the configuration of the rotary kiln is well known, and thus detailed descriptions thereof will be omitted.

Figure 1:
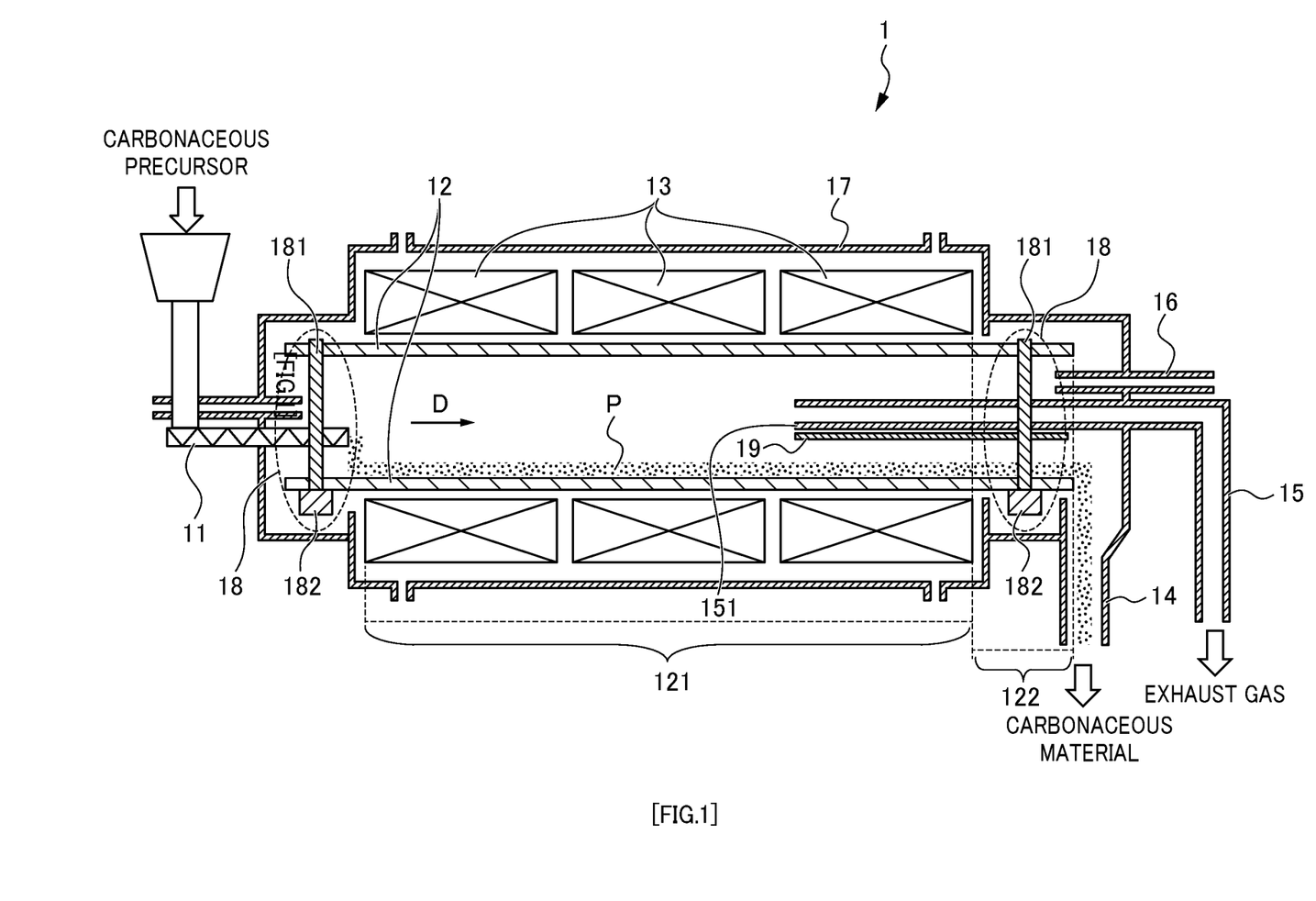
FIG. 1 is a schematic view of an example of a rotary kiln.

FIG. 1 is a schematic view of an example of a rotary kiln. Note that in this schematic view, for convenience, a rotary kiln 1 is disposed horizontally, but in practice, the rotary kiln 1 is disposed inclined from the upper left to the lower right of this drawing. In addition, both powder of the carbon precursor and powder of the alkali-impregnated carbonaceous material are represented by P.

In the rotary kiln 1, the powder of the alkali-impregnated carbon precursor is fed to a furnace reactor tube 12 through a feeding unit 11 (hopper and feeder). Here, the furnace reactor tube 12 is rotated by rotating units 18 each including a metal ring 181 and a bearing 182 and provided on both ends of the furnace reactor tube 12. Specifically, the metal rings 181 are attached to the furnace reactor tube 12, and force is transmitted from the bearings 182 to the metal rings 181 to rotate the furnace reactor tube 12. Furthermore, the inside of the furnace reactor tube 12 is maintained in a non-oxidizing gas atmosphere. The powder of the carbon precursor fed inside the furnace reactor tube 12 is heated in a heat treatment portion 121 of the furnace reactor tube 12 while moving in the direction of arrow D, the heat treatment portion 121 being surrounded by heating units 13 (heaters). In the process of transferring from the heat treatment portion 121 to a cooling portion 122, the carbonaceous material adhering to the furnace reactor tube by thermophoresis is peeled off from the furnace reactor tube by a scraper 19. The powder of the carbonaceous material obtained in this manner is discharged from a discharge unit 14 provided at the end of the furnace reactor tube 12 opposite to the feeding unit 11.

An exhaust gas containing an evolved gas containing alkali metal volatilized by main heat treatment and a carbonaceous matter flied from the carbon precursor and the carbonaceous material is basically evolved inside the furnace reactor tube 12, but it is necessary to prevent the exhaust gas from diffusing from the end of the furnace reactor tube 12 to the discharge unit 14, and the bearing 182 and the heating unit 13 that continue into the discharge unit 14. Furthermore, the alkali metal and the compound thereof in the exhaust gas may condense and precipitate on the surface of the carbonaceous material that passes through the heat treatment portion 121 to the cooling portion 122, and some of the alkali metal and the compound thereof may be incorporated into the structure of the carbonaceous material. Thus, an exhaust unit 15 (gas exhaust pipe) is provided inside the furnace reactor tube 12, and an exhaust gas is evacuated therethrough. In order to prevent condensation of the exhaust gas passing through the exhaust unit 15, it is preferable to keep warm and heat the exhaust unit 15 provided in the cooling portion of the furnace reactor tube and outside the furnace reactor tube to keep the exhaust unit 15 at a high temperature. The temperature of the exhaust unit 15 is not particularly limited, but is preferably 600° C. or higher, more preferably 800° C. or higher, and even more preferably 900° C. or higher. In this manner, condensation, precipitation, and accumulation of an alkali metal and a compound thereof to a furnace body 17 can be prevented, and condensation and precipitation to the heated carbonaceous material can be prevented.

As illustrated in FIG. 1, a suction port 151 of the exhaust unit 15 is preferably provided on the discharge unit 14 side so as to oppose to the feeding unit 11 side to feed the non-oxidizing gas from a gas injection unit 16 disposed on the feeding unit 11 side. In this case, the evolved gas occurring in the furnace reactor tube moves together with the carbonaceous material to the low-temperature part of the furnace reactor tube, and the alkali metal and the compound thereof condense and precipitate inside the furnace reactor tube and on the carbonaceous material. Therefore, by providing the exhaust unit 15 so that the suction port 151 is disposed in the heat treatment portion 121, precipitation of the alkali metal and the compound thereof can be suppressed. However, an exhaust gas evolved from carbon precursor, which passes through the suction port 151 and is present on the downstream side (discharge unit 14 side), and an exhaust gas that has progressed to the downstream side (discharge unit 14 side) without being sucked by the suction port 151 may be evolved. Therefore, a gas injection unit 16 is provided on the discharge unit 14 side, and non-oxidizing gas is injected toward the feeding unit 11. It is preferable to reduce the leakage of exhaust from the exhaust unit 15 in this manner.

The gas injection unit is not limited to the above-described one location, and a plurality of gas injection units may be provided. For example, a gas injection unit in which non-oxidizing gas is discharged from the feeding unit 11 side to the discharge unit 14 side may be further provided. As a result, precipitation of an alkali metal or a compound thereof near the feeding unit 11 can be suppressed.

The temperature of the furnace reactor tube 12 is lower toward the end thereof, and thus when the suction port 151 is disposed near the end of the furnace reactor tube 12, an alkali metal and a compound thereof may precipitate on the carbonaceous material before the exhaust gas is sucked from the suction port 151. The position of the suction port 151 is not particularly limited, but when the suction port 151 is opposed to the feeding unit 11 and the exhaust unit 15 is provided on the discharge unit 14 side, the temperature of the suction port 151 is preferably 600° C. or higher, more preferably 800° C. or higher, and even more preferably 1000° C. or higher.

In the rotary kiln 1 as illustrated in FIG. 1, the suction port of the exhaust unit can be opposed to the discharge unit 14 side and provided on the feeding unit 11 side. In such a case, preferably, the gas injection unit is disposed on the feeding unit 11 side and the non-oxidizing gas is injected toward the discharge unit 14, as well as the gas injection unit is disposed on the discharge unit 14 side and the non-oxidizing gas is injected toward the feeding unit 11. By providing the gas injection unit in this manner, it is also possible to suppress condensation and precipitation of alkali metal or compound thereof at the low-temperature part of the end of the furnace reactor tube 12.

Note that in this manner, when the suction port of the exhaust unit is provided on the feeding unit 11 side so as to oppose the discharge unit 14 side, the suction port may be disposed in the low-temperature part. In such a case, even if an alkali metal and a compound thereof condense and precipitate on the carbon precursor or carbonaceous material, the alkali metal and the compound are then transferred to the carbon precursor heat treatment portion 121 to vaporize again.

Areal Weight of Layer

In the heating step, the upper limit of the weight per unit area of the carbon precursor (also called "areal weight") is preferably 15 kg/m$^2$ or less, more preferably 10 kg/m$^2$ or less, and even more preferably 8 kg/m$^2$ or less. When the areal weight exceeds 15 kg/m$^2$, a decomposition gas evolved from the carbon precursor may cause a secondary decomposition reaction in the layer to alter the surface of the heated carbonaceous material. The lower limit of the areal weight is preferably 0.1 kg/m$^2$ or greater, more preferably 0.3 kg/m$^2$ or greater, and even more preferably 0.5 kg/m$^2$ or greater. In a case where the areal weight is less than 0.1 kg/m$^2$, the production amount may be small. Note that when main heat treatment is performed by placing a carbon precursor on a flat plate in a powdery form, the areal weight is defined as a value obtained by dividing the weight of the carbon precursor placed on the flat plate by the area of the flat plate. On the other hand, when main heat treatment is performed by moving the carbon precursor within the furnace reactor tube as in a rotary kiln, the areal weight is defined as a value calculated as follows.

When the length of the furnace reactor tube is L (m), the inner diameter of the furnace reactor tube is D (m), the inclination is Y (m/m), and the rotational speed is N (rpm), the passing time T (min) of the furnace reactor tube is expressed as follows.

$$T = \frac{0.19619 \times L}{D \times Y \times N} \quad \text{[Math. 1]}$$

When the amount of carbon precursor fed from a feeder is W (kg/min), the weight (kg) of the carbon precursor present in the furnace reactor tube is expressed as follows.

$$T \times W = \frac{0.19619 \times L \times W}{D \times Y \times N} \quad \text{[Math. 2]}$$

In addition, when the inner surface area of the furnace reactor tube is D×π×L (m²), and the range angle of the furnace reactor tube in which the carbon precursor is present is 60°, the area S (m²) is represented by:

$$S = \frac{D \times \pi \times L}{6} \quad \text{[Math. 3]}$$

and the areal weight A (kg/m²) is given by the following expression.

$$A = \frac{T \times W}{S} = \frac{0.19619 \times L \times W \times 6}{D \times Y \times N \times D \times \pi \times L} = \frac{1.177 \times W}{D^2 \times Y \times N \times \pi} \quad \text{[Equation 4]}$$

Scraper

In main heat treatment, when a rotary kiln is used, the carbon precursor is fed to the furnace reactor tube, and along with the rotation of the furnace reactor tube of the rotary kiln, the carbon precursor passes through the heat treatment portion 121 and the cooling portion 122, and the heated carbon is collected. In this process, the temperature within the furnace reactor tube abruptly changes at the portion entering the heating zone and the portion exiting the heating zone, and a force called thermophoresis acts in the portions having this abrupt temperature change, and the carbonaceous material after heating adheres to the furnace reactor tube, which may make it difficult to smoothly move the carbon to be heated within the furnace reactor tube. Furthermore, an alkali metal or a compound containing alkali metal that has volatilized by main heat treatment adheres to the carbonaceous material after heating and the inside of the furnace, which may make it difficult to move the carbonaceous material in the furnace. When the movement of the carbonaceous material in the furnace becomes difficult in this way, it becomes difficult to discharge the carbonaceous material, which makes it difficult to stably perform main heat treatment. To avoid this, a scraper is provided in the furnace reactor tube, so that the carbonaceous material after heating that has adhered to the surface of the furnace reactor tube can be scraped. From this perspective, it is preferable to provide the scraper in main heat treatment by the rotary kiln.

The material of the scraper is not particularly limited as long as the material has a strength for peeling off the heated carbonaceous material adhering to the furnace reactor tube, a heat resistance against a temperature of 1000° C. or higher, and alkaline resistance. Examples of materials having excellent strength, heat resistance, and alkaline resistance include graphite and ceramics. A material having the structure of $SiO_2$ like mullite ($SiO_2/Al_2O_3$) is not preferable because $SiO_2$ and alkali hydroxide react to form an alkali silicate compound. Examples of available ceramics include alumina ($Al_2O_3$), zirconia ($ZrO_2$), magnesia (MgO), silicon carbide (SiC), tungsten carbide (WC), silicon nitride ($Si_3N_4$), and titanium nitride (TiN). Of these, graphite is particularly preferable because it has excellent heat resistance, thermal shock resistance, and chemical resistance.

In consideration of peeling off the aforementioned adhering material, the installation position of the scraper is preferably a high temperature area or the vicinity thereof, more specifically, preferably a temperature area of 500° C. or higher, more preferably 800° C. or higher, and even more preferably 1000° C. or higher.

Exhaust Gas Treatment Step

The exhaust gas treatment step is a step of bringing a non-oxidizing exhaust gas containing the evolved gas occurring in the heat treatment step and a flying carbonaceous matter into contact with water or an aqueous solution to treat the exhaust gas.

Specifically, the exhaust gas is blown into a cooling can filled with water or an aqueous solution and brought into direct contact with water or aqueous solution to cool and absorb the evolved gas in the exhaust gas, and at the same time, the flying matter of the carbon heated is collected in the liquid, so that a large quantity of highly dangerous exhaust gas produced by continuous heating of a carbon precursor impregnated with an alkali metal compound can be continuously safely treated.

Figure 2:
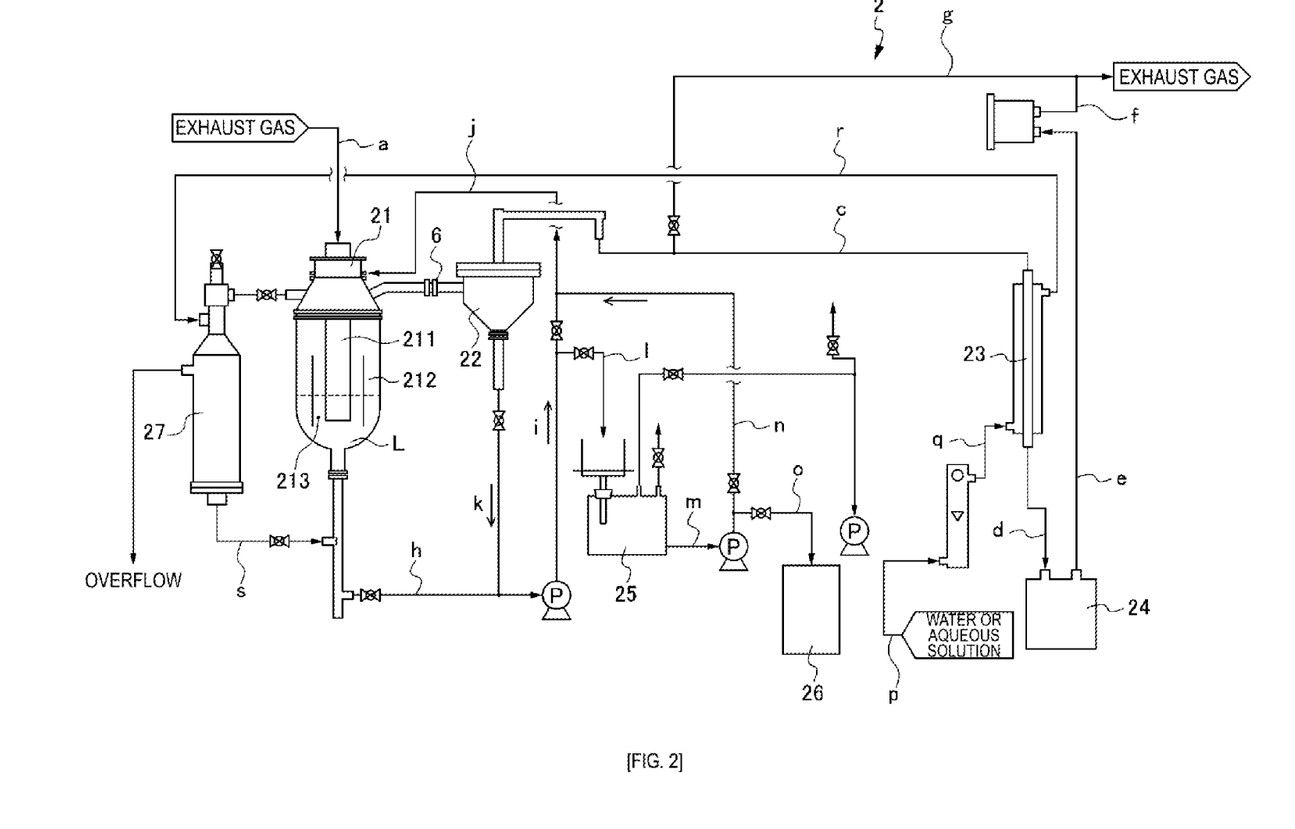
FIG. 2 is a schematic view of an example of an exhaust gas treatment system.

A method of such an exhaust gas treatment will be described with reference to FIG. 2. FIG. 2 is a schematic view of an example of an exhaust gas treatment system.

The exhaust gas enters the cooling can 21 filled with water or aqueous solution (L) through a piping a. The exhaust gas passes through a downcomer tube 211 provided in the center of the cooling can 21 and is injected into the liquid in a donut-shaped space 213 between the downcomer tube 211 and a wear 212 placed concentrically with the downcomer tube 211 to form a gas-liquid mixed phase flow, which moves upward in the space 213. At this time, the alkali metal and the compound thereof in the gas react with water or an aqueous solution to form alkali hydroxide or the like, thereby absorbing the alkali metal in the exhaust gas, and the flying carbonaceous matter is collected at the same time. The mixed phase flow is separated into gas and liquid at the top of the wear 212, and the gas is discharged from the top of the cooling can 21, and the liquid is lowered and fed again to the space 213 near the lower part of the outer periphery of the wear 212 and circulated.

The exhaust gas from which the alkali metal and the flying carbonaceous matter have been removed in this manner enters a mist separator 22 through a piping b, and mist in the exhaust gas is removed. Thereafter, the exhaust gas enters the cooling can 23 through a piping c and is cooled. The exhaust gas and water evolved due to condensation by being cooled pass through a piping d and only the water is stored in a drain pot 24. The exhaust gas with moisture removed in this manner passes through a piping e and is discharged through a piping f. The exhaust rate is controlled by a blower. A piping g is a piping used when cooling in the cooling can 23 is omitted.

On the other hand, in the cooling can 21, the water or aqueous solution (L) in the cooling can 21 is gradually extracted from a piping h and pumped up, passes through a piping i and a piping j (hereinafter, these pipings are also referred to as "circulating water"), forms a wetted wall layer (layer for protecting piping from high-temperature exhaust gas) on the inner wall of the downcomer tube 211 of the cooling can 21, and is finally returned to the cooling can. Furthermore, the water or aqueous solution that has been separated and condensed in the mist separator 22 is returned to the cooling can 21 in a similar manner through a piping k, the piping i, and the piping j. The water or aqueous solution that circulates through the piping i in this manner is transferred to a filter 25 through a piping I, and the flying carbonaceous matter is filtered. Note that the filtration method is not particularly limited, but vacuum filtration or the like can be suitably used. When the flying carbonaceous matter filtered is dried and then subjected to main heat treatment, it can be used as the carbon precursor. On the other hand, the mother liquor is returned to the circulating water through a piping m and a piping n.

When such an exhaust gas treatment system 2 is operated for a long period of time, the alkaline concentration in the aqueous solution in the cooling can increases, and therefore, a portion of the water or aqueous solution is extracted via a piping o and recovered in a collection can 26. Replenished water passes through a piping p and a piping q, passes through a piping r via the cooling can 23, and enters an overflow tube 27. The overflow tube 27 includes a mechanism for keeping the liquid level in the cooling can constant, and when the aqueous solution in the cooling can is extracted from the piping o, the liquid level in the cooling can lowers, and the cooling can is replenished with the water in the overflow tube 27 through a piping s. Note that the alkali aqueous solution extracted from the piping o can be used as an alkali metal compound raw material for impregnating the carbon precursor with alkali.

The aqueous solution in the cooling can 21 is not particularly limited as long as it is an aqueous solution capable of absorbing metallic sodium or sodium hydride. Note that the concept of "aqueous solution" is a concept which includes an aqueous solution which is fed as water at the start of operation of the exhaust gas treatment system 2 or when fed to the system, and changes into a sodium hydroxide aqueous solution by absorbing metallic sodium and/or sodium hydride and/or by mixing with the circulating water including sodium hydroxide as the water circulates through the exhaust gas treatment system 2.

Washing Step

Although not an essential aspect, the production method according to an embodiment of the present invention can include a washing step in which the alkali metal element and the alkali metal compound are washed and removed (alkali metal washing). Washing of the alkali metal and the alkali metal compound is not limited, but can be performed after main heat treatment.

When a large amount of the alkali metal element and the alkali metal compound remain, the carbonaceous material becomes strongly alkaline. In addition, when the alkali metal element and the alkali metal compound remain in the carbonaceous material, the alkali metal may move to the counter electrode at the time of discharge of the secondary battery, which may have an adverse effect on the charge/discharge characteristics. Therefore, the alkali metal and the alkali metal compound are preferably removed from the carbonaceous material.

That is, washing (demineralization) of the alkali metal element and the alkali metal compound is performed to prevent the alkali metal element and the alkali metal compound from remaining in the carbonaceous material. When an impregnated amount of the alkali metal element and the alkali metal compound is small, a residual amount of the alkali metal becomes small, but the doping/de-doping capacity of lithium tends to be lowered. In addition, when the heating temperature is high, the alkali metal volatilizes to decrease the residual amount, and in particular, when the heating temperature is too high, the pores for storing lithium become small to decrease the doping/de-doping capacity of lithium, which is not preferable. Therefore, when the impregnated amount of the alkali metal element and the alkali metal compound is large, and when the heating temperature is low, it is preferable to perform washing of the alkali metal to reduce the residual amount of the alkali metal.

Removal of alkali metal elements and alkali metal compounds can be performed by a known method. Specifically, removal of alkali metal elements and alkali metal compounds can be performed in a gas phase or in a liquid phase. In the case of a gas phase, alkali metal elements or alkali metal compounds are removed by volatilization at a high temperature.

In the case of a liquid phase, for removing alkali metal elements and alkali metal compounds from the carbonaceous precursor by washing, it is preferable to perform treatment by immersing the carbonaceous precursor in an acid such as hydrochloric acid or water. That is, acid washing or water washing is preferable, and water washing entailing treatment by immersion in water is particularly preferable. The acid or water that is used may be used at room temperature, but a heated one (for example, hot water) may also be used.

Coating Step

Although not an essential aspect, the production method according to an embodiment of the present invention can preferably include a step of coating the heated product obtained in the heat treatment step described above with pyrolytic carbon. Coating with pyrolytic carbon may be performed using the CVD method described in Patent Document 4, for example. Specifically, a heated product is brought into contact with a straight-chain or cyclic hydrocarbon gas, and carbon purified by thermolysis is vapor-deposited onto the heated product. This method is well known as the so-called chemical vapor deposition method (CVD method). The specific surface area of the obtained carbonaceous material can be controlled by the coating step using pyrolytic carbon.

The pyrolytic carbon used in an embodiment of the present invention is not limited as long as it can be added as a hydrocarbon gas and can reduce the specific surface area of the carbonaceous material. The hydrocarbon gas is preferably mixed with a non-oxidizing gas and brought into contact with the carbonaceous material.

The number of carbon atoms of the hydrocarbon is not limited but is preferably from 1 to 25, more preferably from 1 to 20, even more preferably from 1 to 15, and most preferably from 1 to 10.

The carbon source of the hydrocarbon gas is also not limited, but examples include methane, ethane, propane, butane, pentane, hexane, octane, nonane, decane, ethylene, propylene, butene, pentene, hexene, acetylene, cyclopentane, cyclohexane, cycloheptane, cyclooctane, cyclononane, cyclopropene, cyclopentene, cyclohexene, cycloheptene, cyclooctene, decalin, norbornene, methylcyclohexane, norbornadiene, benzene, toluene, xylene, mesitylene, cumene, butylbenzene, and styrene. In addition, a gaseous organic substance and a hydrocarbon gas produced by heating a solid or liquid organic substance may also be used as a carbon source for the hydrocarbon gas.

The temperature of the system in which the hydrocarbon gas is brought into contact with the carbonaceous material is not limited but is preferably from 600 to 1000° C., more preferably from 650 to 1000° C., and even more preferably from 700 to 950° C.

The contact time is also not particularly limited but is preferably from 10 minutes to 5 hours and more preferably from 15 minutes to 3 hours. However, the preferable contact time differs depending on the carbonaceous material to be coated, and the specific surface area of the obtained carbonaceous material can basically be reduced as the contact time becomes longer. That is, the coating step is preferably performed under conditions in which the specific surface area of the obtained carbonaceous material is 30 $m^2/g$ or less.

In addition, the apparatus used for coating is not limited, but coating may be performed, for example, a fluidized bed furnace can be used to carry out a continuous or batch type intralayer flow system such as a fluidized bed. The amount of gas fed (distribution volume) is also not limited.

Examples of the non-oxidizing gas include an inert gas such as helium and argon, or nitrogen, and these may be used alone or as a mixture. The preferred range of the volume concentration (vol %) of the hydrocarbon gas in the non-oxidizing gas used in the coating step of the carbonaceous material varies depending on the hydrocarbon gas used. This is because the volume of a hydrocarbon depends on the number of moles and when the hydrocarbon is subjected to pyrolysis to coat the carbonaceous material with pyrolytic carbon, the volume is determined by the concentration of carbon atoms in the non-oxidizing gas. The carbon concentration (g/L) with respect to the non-oxidizing gas is not particularly limited, but for example, is preferably from 0.001 to 3.0 g/L, more preferably from 0.01 to 2.0 g/L, and even more preferably from 0.02 to 1.0 g/L.

Reheating Treatment Step

Although not an essential aspect, the production method according to an embodiment of the present invention preferably includes a reheating treatment step. This reheating treatment step is a step for carbonizing the pyrolytic carbon coated on the surface in the heat treatment step described above.

The temperature in the reheating treatment step is, for example, from 800 to 1500° C. The lower limit of the temperature in the reheating treatment step is 800° C. or higher, more preferably 1000° C. or higher, and particularly preferably 1050° C. or higher. The upper limit of the temperature in the reheating treatment step is 1500° C. or lower, more preferably 1400° C. or lower, and particularly preferably 1300° C. or lower.

The reheating treatment step is preferably performed in a non-oxidizing gas atmosphere. Examples of non-oxidizing gases include helium, nitrogen, and argon and these may be used alone or as a mixture. The reheating treatment may also be performed in a gas atmosphere in which a halogen gas such as chlorine is mixed with these non-oxidizing gases. In addition, the reheating treatment can be performed under reduced pressure at a pressure of 10 kPa or lower, for example. The reheating treatment time is not particularly limited, but reheating treatment can be performed for 0.1 to 10 hours, for example, and is preferably performed for 0.3 to 8 hours, and more preferably for 0.4 to 6 hours.

Carbonaceous Material for Negative Electrode of Non-Aqueous Electrolyte Secondary Battery The carbonaceous material for a negative electrode of a non-aqueous electrolyte secondary battery according to an embodiment of the present invention can be produced by the above described method for producing a carbonaceous material for a negative electrode of a non-aqueous electrolyte secondary battery. Physical properties of the carbonaceous material for a negative electrode of a non-aqueous electrolyte secondary battery according to an embodiment of the present invention are not particularly limited, but the true density is from 1.20 to 1.60 $g/cm^3$, the specific surface area determined by a BET method using nitrogen adsorption is 30 $m^2/g$ or less, the average particle size is 50 μm or less, and the atomic ratio (H/C) of hydrogen atoms to carbon atoms determined by elemental analysis is 0.1 or less.

True Density

The true density of a graphitic material having an ideal structure is 2.27 $g/cm^3$, and the true density tends to decrease as the crystal structure becomes disordered. Accordingly, the true density can be used as an index expressing the carbon structure. The true density described herein was measured using a butanol method.

The true density of the carbonaceous material according to an embodiment of the present invention is from 1.20 to 1.60 $g/cm^3$. The upper limit of the true density is preferably 1.55 $g/cm^3$ or less, more preferably 1.50 $g/cm^3$ or less, even more preferably 1.48 $g/cm^3$ or less, and most preferably 1.47 $g/cm^3$ or less. A carbonaceous material having a true density exceeding 1.60 $g/cm^3$ may have a small number of pores with a size capable of storing lithium, and the doping and de-doping capacity may be small. In addition, increase in true density involves the selective orientation of the carbon hexagonal plane, and thus the carbonaceous material often undergoes expansion and contraction at the time of lithium doping and de-doping, which is not preferable. On the other hand, the lower limit of the true density is preferably 1.25 $g/cm^3$ or greater, more preferably 1.30 $g/cm^3$ or greater, particularly preferably 1.40 $g/cm^3$ or greater, and most preferably 1.43 $g/cm^3$ or greater. In a carbonaceous material having a true density of less than 1.20 $g/cm^3$, an electrolyte solution permeates the pores, so that a stable structure for lithium storage sites may not be maintained. Furthermore, the electrode density decreases, which may cause a decrease in volume energy density.

Specific Surface Area

The specific surface area may be determined with an approximation formula derived from a BET formula based on nitrogen adsorption. The specific surface area of the carbonaceous material according to an embodiment of the present invention is 30 $m^2/g$ or less. When the specific surface area exceeds 30 $m^2/g$, reactions with the electrolyte solution increase, which may lead to an increase in irreversible capacity and thus a decrease in battery performance. The upper limit of the specific surface area is preferably 30 $m^2/g$ or less, more preferably 20 $m^2/g$ or less (or less than 20 $m^2/g$), particularly preferably 10 $m^2/g$ or less (or less than 10 $m^2/g$), and most preferably less than 5 $m^2/g$. In addition, the lower limit of the specific surface area is not particularly limited, but when the specific surface area is less than 0.5 $m^2/g$, the input/output characteristics may be reduced, and thus the lower limit of the specific surface area is preferably 0.5 $m^2/g$ or greater.

Average Particle Size $D_{v50}$

The average particle size ($D_{v50}$) of the carbonaceous material according to an embodiment of the present invention is from 1 to 50 μm. The lower limit of the average particle size is preferably 1 μm or greater, more preferably 1.5 μm or greater and particularly preferably 2.0 μm or greater. When the average particle size is less than 1 μm, the specific surface area increases due to an increase in fine powder. Due to this, the reactivity with an electrolyte solution increases, and the irreversible capacity, which is the capacity that is charged but not discharged, also increases, and the percentage of the positive electrode capacity that is wasted thus increases, which is not preferable. The upper limit of the average particle size is preferably 40 µm or less, more preferably 35 µm or less, particularly preferably 30 µm or less, and most preferably 25 µm or less. When the average particle size exceeds 50 µm, the diffusion free path of lithium within a particle increases, which makes rapid charging and discharging difficult. Furthermore, in the case of a secondary battery, increasing the electrode area is important for improving the input/output characteristics, and thus it is necessary to reduce the coating thickness of the active material on the current collector at the time of electrode preparation. In order to reduce the coating thickness, it is necessary to reduce the particle size of the active material. From this perspective, the upper limit of the average particle size is preferably 50 µm or less.

Atomic Ratio (H/C) of Hydrogen Atoms to Carbon Atoms

The H/C is determined by measuring hydrogen atoms and carbon atoms by elemental analysis. Since the hydrogen content of the carbonaceous material decreases as the degree of carbonization increases, the H/C tends to decrease. Accordingly, the H/C is effective as an index expressing the degree of carbonization. The H/C of the carbonaceous material of an embodiment of the present invention is 0.1 or less and preferably 0.08 or less. The H/C is particularly preferably 0.05 or less. When the H/C ratio of hydrogen atoms to carbon atoms exceeds 0.1, the amount of functional groups present in the carbonaceous material increases, which may increase the irreversible capacity due to a reaction with lithium.

Alkali Metal Element Content

The alkali metal element content of the carbonaceous material of an embodiment of the present invention is not particularly limited but is preferably from 0.05 to 5 wt. %. The lower limit of the alkali metal element content is more preferably 0.5 wt. %. On the other hand, the upper limit of the alkali metal element content is preferably 4 wt. % or less, more preferably 3 wt. % or less, and most preferably 1.5 wt. % or less. If the alkali metal element content is too high, the carbonaceous material becomes strongly alkaline, which may cause the gelification of the PVDF used as a binder and exert an adverse effect on the charge/discharge characteristics. Therefore, the content is preferably made 0.05 to 5 wt. % by removing the added alkali by washing the alkali metal compound.

EXAMPLES

The present invention will be described further in detail using examples, but the present invention is not limited to these examples.

Measurement methods for physical properties of the carbon precursor ("atomic ratio of hydrogen/carbon (H/C)", "oxygen content", and "true density") and physical properties of the carbonaceous material for a non-aqueous electrolyte secondary battery according to an embodiment of the present invention ("atomic ratio of hydrogen/carbon (H/C)", "specific surface area", "true density determined by butanol method", "average particle size determined by laser diffraction", and "alkali metal element content" will be described hereinafter, and physical properties described in the present specification, including those in the examples, are based on values determined by the following methods.

Atomic Ratio (H/C) of Hydrogen/Carbon

The atomic ratio was measured in accordance with the method stipulated in JIS M8819. The ratio of the numbers of hydrogen/carbon atoms was determined from the mass ratio of hydrogen and carbon in a sample as obtained by elemental analysis using a CHN analyzer.

Oxygen Content

The oxygen content was measured in accordance with the method stipulated in JIS M8819. The mass percentage of carbon, hydrogen, and nitrogen in a sample as obtained by elemental analysis using a CHN analyzer was subtracted from 100, and this was used as the oxygen content.

Specific Surface Area

The specific surface area was measured by a single-point BET (Brunauer, Emmett and Teller) method in accordance with the method stipulated in JIS Z8830:2013 (ISO9277:2010) "method for measuring specific surface area of powder (solid) by gas adsorption". The measurement of the amount of adsorbed gas was performed using a carrier gas method. Specifically, the amount of adsorption of nitrogen in the carbonaceous material at the temperature of liquid nitrogen was measured as follows using a "Flow Sorb II 2300" available from Micromeritics. A test tube was filled with the carbonaceous material, and the test tube was cooled to −196° C. while purging helium gas containing nitrogen gas at a concentration of 20 mol % so that the nitrogen was adsorbed in the carbonaceous material. The test tube was returned to room temperature. The amount of nitrogen desorbed from the sample at that time was measured with a thermal conductivity detector and used as the amount of adsorbed gas. In the calculation of the specific surface area, 0.162 $nm^2$ was employed as a molecular cross-sectional area of nitrogen.

True Density Determined by Butanol Method

Measurements were performed using butanol in accordance with the method stipulated in JIS R7212. A summary is given below. Both the carbonaceous material obtained by heat-treating a carbon precursor at 1100° C. and the carbonaceous material of an embodiment of the present invention were measured using the same measurement method.

The mass ($m_1$) of a pycnometer with a bypass having an internal volume of approximately 40 mL was precisely measured. Next, after a sample was placed flat at the bottom of the pycnometer so that the thickness of the sample was approximately 10 mm, the mass ($m_2$) was precisely measured. Next, 1-butanol was slowly added to the pycnometer to a depth of approximately 20 mm from the bottom. Next, the pycnometer was gently oscillated, and after it was confirmed that no large air bubble was evolved, the pycnometer was placed in a vacuum desiccator and gradually evacuated to a pressure of 2.0 to 2.7 kPa. The pressure was maintained for 20 minutes or longer, and after the generation of air bubbles stopped, the pycnometer was taken out and further filled with 1-butanol. After a stopper was inserted, the pycnometer was immersed in a constant-temperature bath (adjusted to 30±0.03° C.) for 15 minutes or longer, and the liquid level of 1-butanol was aligned with the marked line. Next, the pycnometer was removed, and after the outside of the pycnometer was thoroughly wiped and cooled to room temperature, the mass ($m_4$) was precisely measured. Next, the same pycnometer was filled with 1-butanol alone and immersed in a constant-temperature bath in the same manner as described above, and after the marked line was aligned, the mass ($m_3$) was measured. In addition, distilled water which was boiled immediately before use and from which the dissolved gas was removed was placed in the pycnometer and immersed in a constant-temperature bath in the same manner as described above, and after the marked line was aligned, the mass ($m_5$) was measured. The true density ($\rho_{Bt}$) is calculated using the following equation.

$$\rho_{Bt} = \frac{m_2 - m_1}{m_2 - m_1 - (m_4 - m_3)} \times \frac{m_3 - m_1}{m_5 - m_1} d \quad \text{[Math. 5]}$$

(Here, d is the specific gravity (0.9946) of water at 30° C.
Average Particle Size Three drops of a dispersant (cationic surfactant, "SN-WET 366" (available from San Nopco Limited)) were added to approximately 0.1 g of a sample, and the dispersant was blended into the sample. Next, 30 mL of purified water was added, and after the sample was dispersed for approximately 2 minutes with an ultrasonic washer, the particle size distribution within the particle size range from 0.05 to 3000 μm was determined with a particle size distribution analyzer ("SALD-3000J" available from Shimadzu Corporation).

From the resulting particle size distribution, the particle size yielding a cumulative volume of 50% was determined as the average particle size $D_{v50}$ (μm).
Alkali Metal Element Content For the measurement of alkali metal element content, a carbon sample containing a predetermined alkali metal element was prepared, and a calibration curve, which represents the relationship between a content of the alkali metal element and an X-ray intensity corresponding to each alkali element was created in advance, using an X-ray fluorescence analyzer. Next, the X-ray intensity corresponding to the alkali metal element in X-ray fluorescence analysis was measured for samples, and the content of each alkali element was determined from the calibration curve created above.

X-ray fluorescence analysis was performed by an X-ray fluorescence spectrometer available from Rigaku Corporation, using the following conditions. A holder for irradiation from upper part was used, and the measured area of the sample was within a circumferential line having a diameter of 20 mm. The sample to be measured was placed, the surface thereof was covered with a polyethylene terephthalate film, and the measurement was performed.

Example 1

First, 70 kg of a petroleum pitch with a softening point of 205° C., an atomic ratio H/C of 0.65, and a quinoline insoluble content of 0.4% and 30 kg of naphthalene were charged into a pressure-resistant container with an internal volume of 300 liters and having a stirring blade and an outlet nozzle, and the substances were melted and mixed while heating. After the heat-melted and mixed petroleum pitch was then cooled, the petroleum pitch was pulverized, and the obtained pulverized product was added into water at 90 to 100° C., dispersed under stirring, and cooled to obtain a spherical pitch shaped body. After most of the water was removed by filtration, the naphthalene in the spherical pitch shaped body was extracted with n-hexane and removed. A porous spherical pitch obtained as described above was oxidized by heating while heated air was circulated, and heat-infusible porous spherical oxidized pitch was thus obtained. The oxygen content (oxygen crosslinking degree) of the porous spherical oxidized pitch was 13 wt. %.

Next, the infusible porous spherical oxidized pitch was pulverized using 400S Cyclone Mill (Shizuoka Plant Co., Ltd.) to obtain infusibilized pitch powder with an average particle size of $D_{v50}$ of 20 to 25 μm.

The obtained infusibilized pitch powder was impregnated with NaOH using a vacuum mixing dryer (MTI mixer ED100B (full volume 100 L), available from Tsukishima Machine Sales Co., Ltd.). Specifically, nitrogen was flowed from the shaft seal of the vacuum mixing dryer, 30.0 kg of the infusibilized pitch powder was loaded into the vacuum mixing dryer and agitated by an agitator operating at 80 rpm, and steam was flowed into a jacket of the dryer to warm the dryer while the inside of the dryer was depressurized from the exhaust line. After the state of the dryer was stabilized, 37.5 kg of 20 wt. % sodium hydroxide aqueous solution was added to the infusibilized pitch powder, and the Na-impregnated carbon precursor containing 20 wt % sodium hydroxide was prepared by evaporating the moisture.

The obtained Na-impregnated carbon precursor was subjected to main heat treatment using a roller hearth kiln having a furnace length of 12.6 m. Nitrogen gas was injected into an inlet replacement chamber and an outlet replacement chamber, and nitrogen gas was injected into the furnace body from the low temperature side of the inlet and outlet to the high temperature side of the central part. The temperature inside the furnace was raised toward the central part, and the temperature in a 2.5 m section was set to 1255° C. After passing through this section, the temperature was set so that the temperature was gradually decreased toward the outlet direction and was 100° C. or lower in taking out the heat-treated Na-impregnated carbon precursor. The conveying speed of the graphite plate (hearth) loaded on the rotating roller was set to move the distance of 12.6 m from the inlet to the outlet of the furnace for 60 minutes. After nitrogen purging in the furnace was completed, 50 g of the Na-impregnated carbon precursor was placed on a graphite plate having a side of 300 mm and spread uniformly. The areal weight at this time was 0.55 kg/m². A plurality of such things were made, closely arranged on the roller and moved in the furnace, whereby main heat treatment is performed.

A piping was provided above a location heated at 900° C. or higher of the internal temperature in the furnace, the exhaust gas evolved during main heat treatment was guided through this piping to the cooling can 21 of the exhaust gas treatment system 2 as illustrated in FIG. 2 where the sodium component in the exhaust gas was absorbed in water or an aqueous solution, and the exhaust gas containing hydrogen gas evolved in the carbonization reaction of the carbon precursor was discharged to the atmosphere. The cooling can is filled with water or an aqueous solution, into which the downcomer tube 211 is inserted, and the exhaust gas comes into contact with water or aqueous solution through the downcomer tube 211, and thus internal pressure is evolved in this step. For dealing with this, the exhaust gas passing through the cooling can 21 was suctioned to adjust the internal pressure of the furnace. The roller hearth kiln has a low sealing degree due to the mechanism of inlet/outlet of the furnace and thus suction was performed with the blower of the exhaust gas treatment system so that the internal pressure of the furnace was maintained at 0.03 kPa to 0.5 kPa at gauge pressure.

Na and Na compound remaining in a carbonaceous material obtained by subjecting the NaOH-impregnated carbon precursor to main heat treatment in the above roller hearth kiln were washed and removed with ion exchanged water, filtered, and then dried under reduced pressure at 200° C. to prepare a carbonaceous material. The obtained carbonaceous material was loaded in a furnace, heated to 750° C. in nitrogen and held at 750° C. A mixed gas of hexane and nitrogen gas (carbon concentration of 2.5 g/L with respect to nitrogen gas) was flowed into the furnace for 30 minutes, then the mixed gas was replaced with nitrogen gas, the temperature in the furnace was cooled to room temperature, and the carbonaceous material was coated with pyrolytic carbon to prepare a carbonaceous material for a negative electrode of a non-aqueous electrolyte secondary battery. The specific surface area of the carbonaceous material was 1.5 m$^2$/g, the butanol true density was 1.29 g/cm$^3$, and the Na residual amount was 0.9 wt. %. Furthermore, the battery performance was a charge capacity of 664 Ah/kg, a discharge capacity of 596 Ah/kg, and an irreversible capacity of 68 Ah/kg.

Example 2

A carbonaceous material for a negative electrode of a non-aqueous electrolyte secondary battery was prepared by the same method as in Example 1 except that 11.3 kg of 20 wt. % NaOH aqueous solution was added to 30.0 kg of infusibilized pitch powder and then moisture was evaporated to make a carbon precursor containing 7 wt. % of sodium hydroxide, and that the heated carbon was not coated with pyrolytic carbon. The areal weight at the time of main heat treatment was 0.55 kg/m$^2$. The specific surface area of the obtained carbonaceous material was 13.5 m$^2$/g, the butanol true density was 1.50 g/cm$^3$, and the Na residual amount was 1.0 wt. %. Furthermore, the battery performance was a charge capacity of 610 Ah/kg, a discharge capacity of 523 Ah/kg, and an irreversible capacity of 86 Ah/kg.

Example 3

Infusibilized pitch powder with an average particle size of $D_{v50}$ of 20 to 25 μm was obtained in the same manner as in Example 1. The obtained infusibilized pitch powder was impregnated with NaOH using a vacuum mixing dryer (MTI mixer ED100B (full volume 100 L), available from Tsukishima Machine Sales Co., Ltd.). Specifically, nitrogen was flowed from the shaft seal of the vacuum mixing dryer, 30.0 kg of the infusibilized pitch powder was loaded into the vacuum mixing dryer and agitated by an agitator operating at 80 rpm, and steam was flowed into a jacket of the dryer to warm the dryer, while the inside of the dryer was depressurized from the exhaust line. After the state of the dryer was stabilized, moisture was evaporated to prepare a carbon precursor containing 20 wt. % sodium hydroxide. After 16.7 kg of 20 wt. % aqueous solution of sodium hydroxide was added to the infusibilized pitch powder, the NaOH-impregnated infusibilized pitch powder containing 10 wt. % sodium hydroxide was prepared by evaporating the moisture.

Pre-heat treatment of the NaOH-impregnated infusibilized pitch powder was performed in a continuous rotary kiln. The material of the furnace reactor tube of the continuous rotary kiln was Inconel, the furnace length was 2000 mm, the effective heating length was 950 mm, and the retort inner diameter was 248 mm. The rotary kiln was set to have a slope of 3.0%, the rotational speed of the furnace reactor tube was set to 1.2 rpm, nitrogen gas was flowed in 30 L/min in the same direction (concurrent flow) as the flow of carbon to be pre-heated, and the heater temperature was raised to 620° C., and then held at that temperature. After the rotary kiln was stable, the infusibilized carbon impregnated with NaOH was fed to the furnace reactor tube at a rate of 3.0 kg/h to perform pre-heat treatment. The effective residence time corresponding to the heat treatment time for pre-heat treatment in the rotary kiln was 15 minutes, and the internal pressure of the furnace during pre-heat treatment was 40 to 50 Pa at the gauge pressure. The Na-impregnated carbon precursor was prepared in this manner.

Main heat treatment of the obtained Na-impregnated carbon precursor was performed by the rotary kiln 1 as illustrated in FIG. 1. The rotary kiln 1 is connected to the exhaust gas treatment system 2, and the exhaust gas evolved from the carbon precursor is transported to the exhaust gas treatment system 2 and subjected to a heating treatment.

Specifically, in this rotary kiln, the furnace reactor tube is made of graphite and has an inner diameter of 200 mm, a length of 2500 mm, and the effective heating zone length (heat treatment portion 121) of the heating chamber of 1400 mm. In addition, a scraper was inserted from the discharge side of the carbonaceous material and disposed from the discharge unit of the carbonaceous material of the furnace reactor tube to a range in which the temperature of the furnace reactor tube was 1000° C. or higher. The length of the scraper is 650 mm. Furthermore, a graphite exhaust pipe was provided with a suction port on the feeding side of the carbon precursor as the exhaust means. The length of the exhaust pipe from the discharge port of the carbonaceous material of the furnace reactor tube to the suction port of the exhaust pipe was 700 mm, and when the main heat treatment temperature was set to 1100° C. or higher, the position of the suction port was set such that the temperature of the suction port of the exhaust pipe was 1000° C. or higher. The exhaust pipe was connected to the metal piping near the outlet of the furnace reactor tube, and the exhaust gas evolved by heating the carbon precursor was led to the cooling can 21 of the exhaust gas treatment system 2 via the piping to be treated.

The Na-impregnated carbon precursor was brought in a hopper, and highly pure nitrogen gas was injected to the hopper at 10 L/min, to the inside of the furnace reactor tube on the feeding side of the carbon precursor at 100 L/min, to a hood on the same side at 10 L/min, to the shaft seal at 10 L/min, to the heater box at 10 L/min, to the inside of the furnace reactor tube on the discharge side at 10 L/min, and to an outlet hood on the same side at 10 L/min to replace the inside of the rotary kiln with nitrogen gas. The slope of the furnace reactor tube was set to 6% in the rotary kiln, and the temperature in the rotary kiln was raised while rotating the furnace reactor tube at 3 rpm and held at 1230° C. The internal pressure of the furnace was controlled to be 0.2 kPa at gauge pressure in the blower of the exhaust gas treatment system. The Na-impregnated carbon precursor stored in the hopper was fed into the furnace reactor tube under conditions of 2.0 kg/h using a quantitative feeder, and main heat treatment was performed. Here, a screw feeder was used as the quantitative feeder. The carbonaceous material was collected from 1 hour after starting the feeding of the carbon precursor to the furnace reactor tube in consideration of stabilization of the heating conditions. The internal pressure of the furnace at the time of heating was controlled to be 0.2 to 1.0 kPa at gauge pressure. During main heat treatment, the carbonaceous material subjected to main heat treatment was stably discharged, and the quality thereof was stable. Furthermore, after main heat treatment was completed, when the rotary kiln was disassembled and observed, little condensation and precipitation of metallic sodium and sodium hydride to the furnace body was observed. The areal weight in main heat treatment was 1.73 kg/m$^2$.

Na and Na compound remaining in the carbonaceous material subjected to main heat treatment in the rotary kiln were washed and removed with ion exchanged water and the carbonaceous material was coated with pyrolytic carbon in the same manner as in Example 1 to prepare the carbonaceous material. The specific surface area of this carbonaceous material was 0.8 m²/g, the butanol true density was 1.45 g/cm³, and the Na residual amount was 0.7 wt. %. Furthermore, the battery performance was a charge capacity of 537 Ah/kg, a discharge capacity of 515 Ah/kg, and an irreversible capacity of 59 Ah/kg.

Example 4

A carbonaceous material for a negative electrode of a non-aqueous electrolyte secondary battery was prepared in the same manner as in Example 3 except that 7.89 kg of 20 wt. % NaOH aqueous solution was added to the infusibilized pitch powder and then moisture was evaporated to prepare infusibilized pitch powder containing 5 wt. % sodium hydroxide, that the heating temperature was changed to 1220° C., the slope of the furnace reactor tube was changed to 4%, and the amount of the Na-impregnated carbon precursor fed to the furnace reactor tube was changed to 0.5 kg/h, and that the carbonaceous material was not coated with pyrolytic carbon.

During main heat treatment, the carbonaceous material subjected to main heat treatment was stably discharged, and the quality thereof was stable. Furthermore, after main heat treatment was completed, when the rotary kiln was disassembled and observed, little condensation and precipitation of the metallic sodium and sodium hydride to the furnace body was observed. The areal weight at the time of main heat treatment was 0.65 kg/m². The specific surface area of this carbonaceous material was 9.8 m²/g, the butanol true density was 1.51 g/cm³, and the Na residual amount was 0.5 wt. %. Furthermore, the battery performance was a charge capacity of 573 Ah/kg, a discharge capacity of 489 Ah/kg, and an irreversible capacity of 85 Ah/kg.

Example 5

The carbonaceous material prepared in Example 4 was put in a container made of Inconel 600 having an inner volume of 24 L in which a bottom surface of a conical frustum having the bottom surface and an upper surface each open was connected to either end of a cylinder on the internal surface of which two scraping blades are provided, the container having a structure in which atmospheric gas can be injected and discharged through openings at both ends of the container, and the container was placed in a reactor tube of a batch-type rotary kiln (inner volume: 49 L) sideways. By rotating the reactor tube of the rotary kiln, the cylindrical container rotates at the same rotational speed. The furnace reactor tube in which the cylindrical container was placed was rotated at 0.2 rpm, nitrogen gas was injected into the container at 30 L/min until the oxygen concentration in the cylindrical container was 200 ppm or less, and after the air in the container was replaced with nitrogen gas, the nitrogen gas input was changed to 10 L/min, and the temperature of the furnace reactor tube was raised to 825° C. over 1 hour and held at 825° C. Next, after changing the rotational speed of the furnace reactor tube to 0.7 rpm, nitrogen gas and propane gas were injected into the container at 5 L/min and 5 L/min (carbon concentration in nitrogen gas of 1.61 g/L), respectively. After holding for 130 minutes, the rotational speed of the furnace reactor tube was switched to 0.2 rpm, the injection of propane gas into the container was stopped, and the heater was stopped and allowed to cool while purging nitrogen at a flow rate of 10 L/min. After the temperature of the furnace reactor tube reached 200° C. or lower, the rotation was stopped and after the temperature of the furnace reactor tube reached 50° C. or lower, the carbonaceous material coated with pyrolytic carbon was taken out of the container to obtain a carbonaceous material for a negative electrode of a non-aqueous electrolyte secondary battery. The specific surface area of this carbonaceous material was 0.7 m²/g, the butanol true density was 1.51 g/cm³, and the Na residual amount was 0.4 wt. %. Furthermore, the battery performance was a charge capacity of 566 Ah/kg, a discharge capacity of 496 Ah/kg, and an irreversible capacity of 70 Ah/kg.

Example 6

A carbonaceous material for a negative electrode of a non-aqueous electrolyte secondary battery was prepared in the same manner as in Example 3 except that the main heat treatment temperature was set to 1250° C., the slope of the furnace reactor tube was set to 1.0%, the rotational speed of the furnace reactor tube was set to 1.5 rpm, and the feeding rate of the Na-impregnated carbon precursor to the furnace reactor tube was set to 1.0 kg/h. The areal weight during main heat treatment was 10.4 kg/m². The specific surface area of this carbonaceous material was 1.4 m²/g, the butanol true density was 1.51 g/cm³, and the Na residual amount was 0.6 wt. %. Furthermore, the battery performance was a charge capacity of 446 Ah/kg, a discharge capacity of 394 Ah/kg, and an irreversible capacity of 51 Ah/kg.

Comparative Example 1

Main heat treatment was performed in the same manner as in Example 1 except that the exhaust gas treatment system was not provided. The exhaust gas was cooled from the furnace, sodium hydride adhered to the inside of the piping for the exhaust gas, and the exhaust gas exhibited strong alkalinity, and thus it was determined that metallic sodium and sodium hydride were flied, and the experiment was stopped.

Comparative Example 2

Main heat treatment was performed in the same manner as in Example 3 except that the exhaust gas treatment system was not provided. The exhaust gas was cooled from the furnace, sodium hydride adhered to the inside of the piping for the exhaust gas, and the exhaust gas exhibited strong alkalinity, and thus it was determined that metallic sodium and sodium hydride were flied, and the experiment was stopped.

Non-aqueous electrolyte secondary batteries were produced by the following operations (a) and (b) using the electrodes obtained in Examples 1 to 6, and the electrode and battery performances were evaluated.

(a) Production of Test Battery

Although the carbon material of an embodiment of the present invention is suitable for forming a negative electrode of a non-aqueous electrolyte secondary battery, in order to precisely evaluate the discharge capacity (de-doping capacity) and the irreversible capacity (non-de-doping capacity) of the battery active material without being affected by fluctuation in the performances of the counter electrode, a lithium secondary battery was formed using the electrode obtained above together with a counter electrode comprising lithium metal with stable characteristics, and the characteristics thereof were evaluated.

The lithium electrode was prepared inside a glove box in an Ar atmosphere. An electrode (counter electrode) was formed by spot-welding a stainless steel mesh disc with a diameter of 16 mm on the outer lid of a 2016-size coin-type battery can in advance, punching a thin sheet of metal lithium with a thickness of 0.8 mm into a disc shape with a diameter of 15 mm, and pressing the thin sheet of metal lithium into the stainless steel mesh disc.

A pair of electrodes produced in this way, a liquid obtained by adding $LiPF_6$ at a proportion of 1.5 mol/L to a mixed solvent prepared by mixing ethylene carbonate, dimethyl carbonate, and methyl ethyl carbonate at a volume ratio of 1:2:2 as an electrolyte solution, a separator of a fine porous membrane made from borosilicate glass fibers with a diameter of 19 mm, and a polyethylene gasket were used to assemble a 2016-size coin-type non-aqueous electrolyte-based lithium secondary battery in an Ar glove box.

(b) Measurement of Battery Capacity

Charge-discharge tests were performed on a lithium secondary battery with the configuration described above using a charge-discharge tester ("TOSCAT" available from Toyo System Co., Ltd.). Here, in a battery using a lithium chalcogen compound for the positive electrode, the doping reaction of lithium into the carbon electrode is called "charging", and as in the test battery of an embodiment of the present invention, lithium metal was used for the counter electrode.

In a battery, the doping reaction into the carbon electrode is called "discharging", and the same doping reaction of lithium into the carbon electrode was differently called depending a counter electrode used. Therefore, the doping reaction of lithium into the carbon electrode will be described as "charging" hereafter for convenience. Conversely, "discharging" refers to a charging reaction in the test battery but will be described as "discharging" for convenience because it is a de-doping reaction of lithium from the carbon material. The doping reaction was performed using constant current/constant voltage charging. Constant-current charging was performed at a current density of 0.5 $mA/cm^2$, and after the terminal voltage reached −5 mV, constant-voltage charging was performed at a control voltage of −5 mV. The constant current/constant voltage charging was performed until the applied current reached 20 μA while attenuating the applied current. A value determined by dividing the amount of electricity at this time by the weight of used carbonaceous material was defined as the charging capacity, which was expressed in Ah/kg. Next, a current was applied in the same manner but in the opposite direction to de-dope the carbonaceous material of the lithium with which it was doped. De-doping was performed until the terminal potential was 1.5 V at a current density of 0.5 $mA/cm^2$. At this time, a value determined by dividing the amount of electricity of de-doping by the weight of the carbon material of the electrode is defined as the discharge capacity per unit weight of the carbon material (Ah/kg). Further, the product of the discharge capacity per unit weight and the true density was used as the discharge capacity per unit volume (Ah/L). In addition, the irreversible capacity was determined by subtracting the discharge capacity per unit weight from the charge capacity per unit weight. The charge/discharge capacity and the charge/discharge efficiency were calculated by averaging three measurements for test batteries produced using the same sample.

TABLE 1

| | Na impregnating amount [wt. %] | Areal weight $(kg/m^2)$ | Residual Na (wt. %) | True density $[g/cm^3]$ | SSA $[m^2/g]$ | Discharge capacity (Ah/kg) | Discharge capacity (Ah/L) | Irreversible capacity (Ah/kg) |
|---|---|---|---|---|---|---|---|---|
| Example 1 | 20 | 0.55 | 0.9 | 1.29 | 1.5 | 596 | 769 | 68 |
| Example 2 | 7 | 0.55 | 1.0 | 1.50 | 13.5 | 523 | 785 | 86 |
| Example 3 | 10 | 1.73 | 0.7 | 1.45 | 0.8 | 515 | 747 | 59 |
| Example 4 | 5 | 0.65 | 0.5 | 1.51 | 9.8 | 489 | 738 | 85 |
| Example 5 | 5 | 0.65 | 0.4 | 1.51 | 0.7 | 496 | 749 | 70 |
| Example 6 | 5 | 10.40 | 0.6 | 1.51 | 1.4 | 394 | 595 | 51 |

INDUSTRIAL APPLICABILITY

According to the method for producing a negative electrode material for a non-aqueous electrolyte secondary battery according to an embodiment of the present invention, it is possible to mass-produce a negative electrode material for a non-aqueous electrolyte secondary battery having high discharge, excellent charge/discharge efficiency, and can be effectively used in hybrid electric vehicles (HEV), plug-in hybrid (PHEV), and electric vehicles (EV).

REFERENCE SIGNS LIST

1 Rotary kiln
11 Feeding unit
12 Furnace reactor tube
121 Heat treatment portion
122 Cooling portion
13 Heating unit
14 Discharge unit
15 Exhaust unit
151 Suction port
16 Gas injection unit
17 Furnace body
18 Rotation unit
181 Metal ring
182 Bearing
19 Scraper
2 Exhaust gas treatment system
21 Cooling can
211 Downcomer tube
212 Wear
213 Space
22 Mist separator
23 Cooling can
24 Drain pot
25 Filter
26 Recovery can
27 Overflow tube

The invention claimed is:

1. A method for producing a carbonaceous material for a negative electrode of a non-aqueous electrolyte secondary battery, the method comprising: a heat treatment step and an exhaust gas treatment step, the heat treatment step comprising:
   continuously feeding a carbon precursor containing an alkali metal element and/or an alkali metal compound from a feeding unit of a rotary kiln including the feeding unit, a discharge unit, a furnace reactor tube, and an exhaust unit provided inside the furnace reactor tube;
   introducing a non-oxidizing Ras from a Ras injection unit provided on the discharge unit side in a direction from the discharge unit side to the feeding unit side;
   heating the carbon precursor in a temperature range of 10000 C to 15000 C in a non-oxidizing gas atmosphere to produce a carbonaceous material, and discharging the carbonaceous material continuously from the discharge unit, the discharging including suctioning, into the exhaust unit, a non-oxidizing exhaust gas that contains evolved gas containing alkali metal vaporized by the heating and contains a flying carbonaceous matter flying from the carbon precursor and the carbonaceous material;
   the exhaust gas treatment step comprising:
   blowing the exhaust gas into a cooling can filled with water or an aqueous solution to bring the exhaust gas into direct contact with the water or aqueous solution so that the evolved gas in the exhaust gas is cooled and absorbed, and at the same time, the flying carbonaceous matter is collected in the water or aqueous solution.

2. The method for producing a carbonaceous material for a negative electrode of a non-aqueous electrolyte secondary battery according to claim 1, wherein the heat treatment step includes providing the suctioning the exhaust gas into a suction port of the exhaust unit that is provided to face the discharge unit side and provided on a side where the carbonaceous material is discharged, feeding side of the carbon precursor to suction the exhaust gas.

3. The method for producing a carbonaceous material for a negative electrode of a non-aqueous electrolyte secondary battery according to claim 2, wherein in the heating step, a suction port of the furnace reactor tube has a temperature of 600 C or more.

4. The method for producing a carbonaceous material for a negative electrode of a non-aqueous electrolyte secondary battery according to claim 2, wherein the exhaust gas treatment step further includes a recovery step of filtering the water or aqueous solution in which the exhaust gas has been absorbed and recovering the flying carbonaceous matter in the aqueous solution.

5. The method for producing a carbonaceous material for a negative electrode of a non-aqueous electrolyte secondary battery according to claim 2, wherein in the heat treatment step, the carbon precursor is fed so that an areal weight is 15 kg/m2 or less.

6. The method for producing a carbonaceous material for a negative electrode of a non-aqueous electrolyte secondary battery according to claim 1, wherein the exhaust gas treatment step further includes a recovery step of filtering the water or aqueous solution in which the exhaust gas has been absorbed and recovering the flying carbonaceous matter in the aqueous solution.

7. The method for producing a carbonaceous material for a negative electrode of a non-aqueous electrolyte secondary battery according to claim 1, wherein in the heat treatment step, the carbon precursor is fed so that an areal weight is 15 kg/m2 or less.

8. The method for producing a carbonaceous material for a negative electrode of a non-aqueous electrolyte secondary battery according to claim 1, wherein the heat treatment step further includes introducing the non-oxidizing gas in a direction from a carbonaceous material feeding side to a carbonaceous material discharging side.

9. The method for producing a carbonaceous material for a negative electrode of a non-aqueous electrolyte secondary battery according to claim 8, wherein the heat treatment step includes suctioning the exhaust gas into a suction port of the exhaust unit that is provided to face the feeding unit side and provided on a side where the carbonaceous material is discharged, the discharge side of the carbonaceous material to suction the exhaust gas.

10. The method for producing a carbonaceous material for a negative electrode of a non-aqueous electrolyte secondary battery according to claim 9, wherein in the heating step, a suction port of the furnace reactor tube has a temperature of 600 C or more.

11. The method for producing a carbonaceous material for a negative electrode of a non-aqueous electrolyte secondary battery according to claim 9, wherein the exhaust gas treatment step further includes a recovery step of filtering the water or aqueous solution in which the exhaust gas has been absorbed and recovering the flying carbonaceous matter in the aqueous solution.

12. The method for producing a carbonaceous material for a negative electrode of a non-aqueous electrolyte secondary battery according to claim 9, wherein in the heat treatment step, the carbon precursor is fed so that an areal weight is 15 kg/m2 or less.

13. The method for producing a carbonaceous material for a negative electrode of a non-aqueous electrolyte secondary battery according to claim 8, wherein the exhaust gas treatment step further includes a recovery step of filtering the water or aqueous solution in which the exhaust gas has been absorbed and recovering the flying carbonaceous matter in the aqueous solution.

14. The method for producing a carbonaceous material for a negative electrode of a non-aqueous electrolyte secondary battery according to claim 8, wherein in the heat treatment step, the carbon precursor is fed so that an areal weight is 15 kg/m2 or less.

* * * * *